US011449399B2

(12) United States Patent
Danilov et al.

(10) Patent No.: US 11,449,399 B2
(45) Date of Patent: Sep. 20, 2022

(54) MITIGATING REAL NODE FAILURE OF A DOUBLY MAPPED REDUNDANT ARRAY OF INDEPENDENT NODES

(71) Applicant: EMC IP Holding Company LLC, Hopkinton, MA (US)

(72) Inventors: Mikhail Danilov, Saint Petersburg (RU); Yohannes Altaye, Dumfries, VA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 399 days.

(21) Appl. No.: 16/526,182

(22) Filed: Jul. 30, 2019

(65) Prior Publication Data
US 2021/0034485 A1 Feb. 4, 2021

(51) Int. Cl.
*G06F 3/06* (2006.01)
*G06F 11/20* (2006.01)
*G06F 11/07* (2006.01)

(52) U.S. Cl.
CPC ........ *G06F 11/2094* (2013.01); *G06F 3/0619* (2013.01); *G06F 3/0644* (2013.01); *G06F 3/0653* (2013.01); *G06F 3/0689* (2013.01); *G06F 11/0793* (2013.01)

(58) Field of Classification Search
CPC .. G06F 11/2094; G06F 3/0619; G06F 3/0644; G06F 3/0653; G06F 3/0689; G06F 11/0793
USPC .......................................................... 714/2
See application file for complete search history.

(56) References Cited

U.S. PATENT DOCUMENTS

| 5,675,802 A | 10/1997 | Allen et al. |
| 5,805,788 A | 9/1998 | Johnson |
| 5,950,225 A | 9/1999 | Kleiman |
| 6,073,218 A | 6/2000 | Dekoning et al. |

(Continued)

OTHER PUBLICATIONS

Non-Final Office Action received for U.S. Appl. No. 16/177,285 dated Jul. 22, 2020, 31 pages.

(Continued)

*Primary Examiner* — Albert Decady
*Assistant Examiner* — Enam Ahmed
(74) *Attorney, Agent, or Firm* — Amin, Turocy & Watson, LLP

(57) ABSTRACT

Mitigating the effects of a real node failure in a doubly mapped redundant array of independent nodes, e.g., doubly mapped cluster is disclosed. In response to a change in an accessibility to data stored on an extent of a real storage device of a real node of a real cluster, wherein the extent of the real storage device corresponds to a portion of a mapped storage device of a mapped node of a doubly mapped cluster, substituting a reserved extent of a real storage device for the extent of the real storage device. The substituting the reserved extent of the real storage device can correspond to a change in a topology of the doubly mapped cluster, wherein the change in the topology comprises replacing the portion of the mapped storage device with a substitute portion of a mapped storage device that corresponds to the replacement extent of the real storage device. The changed topology can enable writing of data to the substituted portion of a mapped storage device that can cause writing of corresponding data to the reserved extent of the real storage device.

20 Claims, 10 Drawing Sheets

(56) References Cited

U.S. PATENT DOCUMENTS

| | | | |
|---|---|---|---|
| 6,108,684 A | 8/2000 | Dekoning et al. | |
| 6,233,696 B1 | 5/2001 | Kedem | |
| 6,240,527 B1* | 5/2001 | Schneider | G06F 11/1435 |
| | | | 714/21 |
| 6,502,243 B1 | 12/2002 | Thomas | |
| 6,549,921 B1 | 4/2003 | Ofek | |
| 7,007,044 B1* | 2/2006 | Rafert | G06F 11/2082 |
| | | | 707/999.203 |
| 7,103,884 B2* | 9/2006 | Fellin | G06F 11/1443 |
| | | | 717/169 |
| 7,389,393 B1 | 6/2008 | Karr et al. | |
| 7,577,091 B2 | 8/2009 | Antal et al. | |
| 7,631,051 B1 | 12/2009 | Fein et al. | |
| 7,636,814 B1 | 12/2009 | Karr et al. | |
| 7,664,839 B1 | 2/2010 | Karr et al. | |
| 7,680,875 B1 | 3/2010 | Shopiro et al. | |
| 7,694,191 B1 | 4/2010 | Bono et al. | |
| 7,721,044 B1 | 5/2010 | Chatterjee et al. | |
| 7,653,792 B2 | 6/2010 | Shimada et al. | |
| 7,752,403 B1 | 7/2010 | Weinman, Jr. | |
| 7,895,394 B2* | 2/2011 | Nakajima | G06F 3/0652 |
| | | | 709/217 |
| 8,125,406 B1 | 2/2012 | Jensen et al. | |
| 8,261,033 B1 | 9/2012 | Slik et al. | |
| 8,370,542 B2 | 2/2013 | Lu et al. | |
| 8,429,514 B1 | 4/2013 | Goel | |
| 8,479,037 B1 | 7/2013 | Chatterjee et al. | |
| 8,495,465 B1 | 7/2013 | Anholt et al. | |
| 8,504,518 B1 | 8/2013 | Ghemawat et al. | |
| 8,540,625 B2 | 9/2013 | Miyoshi | |
| 8,683,205 B2 | 3/2014 | Resch et al. | |
| 8,725,986 B1 | 5/2014 | Goel | |
| 8,751,599 B2 | 6/2014 | Tran et al. | |
| 8,751,740 B1 | 6/2014 | De Forest et al. | |
| 8,751,897 B2 | 6/2014 | Borthakur et al. | |
| 8,799,746 B2 | 8/2014 | Baker et al. | |
| 8,832,234 B1 | 9/2014 | Brooker et al. | |
| 8,856,619 B1 | 10/2014 | Cypher | |
| 8,856,624 B1 | 10/2014 | Paniconi | |
| 8,892,938 B1* | 11/2014 | Sundaram | G06F 3/0619 |
| | | | 714/6.21 |
| 8,972,478 B1 | 3/2015 | Storer et al. | |
| 9,003,086 B1 | 4/2015 | Schuller et al. | |
| 9,021,296 B1 | 4/2015 | Kiselev et al. | |
| 9,037,825 B1 | 5/2015 | Donlan et al. | |
| 9,052,942 B1 | 6/2015 | Barber et al. | |
| 9,063,838 B1 | 6/2015 | Boyle et al. | |
| 9,098,447 B1 | 8/2015 | Donlan et al. | |
| 9,128,910 B1 | 9/2015 | Dayal et al. | |
| 9,208,009 B2 | 12/2015 | Resch et al. | |
| 9,218,135 B2 | 12/2015 | Miller et al. | |
| 9,244,761 B2 | 1/2016 | Yekhanin et al. | |
| 9,268,783 B1 | 2/2016 | Shilane et al. | |
| 9,274,903 B1 | 3/2016 | Garlapati et al. | |
| 9,280,430 B2 | 3/2016 | Sarfare et al. | |
| 9,405,483 B1 | 8/2016 | Wei et al. | |
| 9,411,717 B2 | 8/2016 | Goss et al. | |
| 9,442,802 B2 | 9/2016 | Hung | |
| 9,477,682 B1 | 10/2016 | Bent et al. | |
| 9,495,241 B2 | 11/2016 | Flynn et al. | |
| 9,619,256 B1 | 4/2017 | Natanzon et al. | |
| 9,641,615 B1 | 5/2017 | Robins et al. | |
| 9,665,428 B2 | 5/2017 | Vairavanathan et al. | |
| 9,747,057 B1 | 8/2017 | Ramani et al. | |
| 9,817,713 B2 | 11/2017 | Gupta et al. | |
| 9,864,527 B1 | 1/2018 | Srivastav et al. | |
| 9,942,084 B1 | 4/2018 | Sorenson, III | |
| 9,971,649 B2 | 5/2018 | Dhuse et al. | |
| 10,001,947 B1 | 6/2018 | Chatterjee et al. | |
| 10,007,561 B1 | 6/2018 | Pudipeddi et al. | |
| 10,055,145 B1 | 8/2018 | Danilov et al. | |
| 10,061,668 B1 | 8/2018 | Lazier et al. | |
| 10,089,026 B1 | 10/2018 | Puhov et al. | |
| 10,097,659 B1 | 10/2018 | Rao | |
| 10,108,819 B1 | 10/2018 | Donlan et al. | |
| 10,127,234 B1 | 11/2018 | Krishnan et al. | |
| 10,216,770 B1 | 2/2019 | Kulesza et al. | |
| 10,242,022 B1 | 3/2019 | Jain et al. | |
| 10,282,262 B2 | 5/2019 | Panara et al. | |
| 10,289,488 B1 | 5/2019 | Danilov et al. | |
| 10,331,516 B2 | 6/2019 | Danilov et al. | |
| 10,361,810 B2 | 7/2019 | Myung et al. | |
| 10,387,546 B1 | 8/2019 | Duran et al. | |
| 10,496,330 B1 | 12/2019 | Bernat et al. | |
| 10,503,611 B1 | 12/2019 | Srivastav et al. | |
| 10,567,009 B2 | 2/2020 | Yang et al. | |
| 10,579,490 B2 | 3/2020 | Danilov et al. | |
| 10,613,780 B1 | 4/2020 | Naeni et al. | |
| 10,628,043 B1 | 4/2020 | Chatterjee et al. | |
| 10,644,408 B2 | 5/2020 | Sakai et al. | |
| 10,671,431 B1* | 6/2020 | Dolan | G06F 3/0649 |
| 10,705,911 B2 | 7/2020 | Vishnumolakala et al. | |
| 10,733,053 B1 | 8/2020 | Miller et al. | |
| 10,740,183 B1 | 8/2020 | Blaum et al. | |
| 10,754,845 B2 | 8/2020 | Danilov et al. | |
| 10,761,931 B2 | 9/2020 | Goyal et al. | |
| 10,797,863 B2 | 10/2020 | Chen et al. | |
| 10,846,003 B2 | 11/2020 | Danilov et al. | |
| 10,951,236 B2 | 3/2021 | Chen et al. | |
| 11,023,331 B2 | 6/2021 | Danilov et al. | |
| 2002/0049883 A1 | 4/2002 | Schneider et al. | |
| 2002/0166026 A1 | 11/2002 | Ulrich et al. | |
| 2002/0191311 A1 | 12/2002 | Ulrich et al. | |
| 2003/0016596 A1 | 1/2003 | Chiquoine et al. | |
| 2005/0027938 A1 | 2/2005 | Burkey | |
| 2005/0071546 A1 | 3/2005 | Delaney et al. | |
| 2005/0080982 A1 | 4/2005 | Vasilevsky et al. | |
| 2005/0088318 A1 | 4/2005 | Liu et al. | |
| 2005/0108775 A1 | 5/2005 | Bachar et al. | |
| 2005/0140529 A1 | 6/2005 | Choi et al. | |
| 2005/0234941 A1 | 10/2005 | Watanabe | |
| 2006/0047896 A1 | 3/2006 | Nguyen et al. | |
| 2006/0075007 A1 | 4/2006 | Anderson et al. | |
| 2006/0143508 A1 | 6/2006 | Mochizuki et al. | |
| 2006/0212744 A1 | 9/2006 | Benner et al. | |
| 2006/0265211 A1 | 11/2006 | Canniff et al. | |
| 2007/0076123 A1 | 4/2007 | Takahashi et al. | |
| 2007/0239759 A1 | 10/2007 | Shen et al. | |
| 2007/0250674 A1 | 10/2007 | Findberg et al. | |
| 2008/0222480 A1 | 9/2008 | Huang et al. | |
| 2008/0222481 A1 | 9/2008 | Huang et al. | |
| 2008/0244353 A1 | 10/2008 | Dholakia et al. | |
| 2008/0320061 A1 | 12/2008 | Aszmann et al. | |
| 2009/0070771 A1 | 3/2009 | Yuyitung et al. | |
| 2009/0113034 A1 | 4/2009 | Krishnappa et al. | |
| 2009/0132543 A1 | 5/2009 | Chatley et al. | |
| 2009/0172464 A1* | 7/2009 | Byrne | G06F 11/1088 |
| | | | 714/5.11 |
| 2009/0183056 A1 | 7/2009 | Aston | |
| 2009/0204959 A1 | 8/2009 | Anand et al. | |
| 2009/0240880 A1 | 9/2009 | Kawaguchi | |
| 2009/0259882 A1 | 10/2009 | Shellhamer | |
| 2010/0031060 A1 | 2/2010 | Chew et al. | |
| 2010/0094963 A1 | 4/2010 | Zuckerman et al. | |
| 2010/0174968 A1 | 7/2010 | Charles et al. | |
| 2010/0218037 A1 | 8/2010 | Swartz et al. | |
| 2010/0293348 A1 | 11/2010 | Ye et al. | |
| 2010/0332748 A1 | 12/2010 | Van der Goot et al. | |
| 2011/0029836 A1 | 2/2011 | Dhuse et al. | |
| 2011/0040937 A1 | 2/2011 | Augenstein et al. | |
| 2011/0066882 A1 | 3/2011 | Walls et al. | |
| 2011/0106972 A1 | 5/2011 | Grube et al. | |
| 2011/0107165 A1 | 5/2011 | Resch et al. | |
| 2011/0138148 A1 | 6/2011 | Friedman et al. | |
| 2011/0161712 A1 | 6/2011 | Athalye et al. | |
| 2011/0191536 A1 | 8/2011 | Mizuno et al. | |
| 2011/0196833 A1 | 8/2011 | Drobychev et al. | |
| 2011/0246503 A1 | 10/2011 | Bender et al. | |
| 2011/0292054 A1 | 12/2011 | Boker et al. | |
| 2012/0023291 A1 | 1/2012 | Zeng et al. | |
| 2012/0096214 A1 | 4/2012 | Lu et al. | |
| 2012/0191675 A1 | 7/2012 | Kim et al. | |
| 2012/0191901 A1 | 7/2012 | Norair | |

(56) References Cited

U.S. PATENT DOCUMENTS

| | | |
|---|---|---|
| 2012/0204077 A1 | 8/2012 | D'Abreu et al. |
| 2012/0233117 A1 | 9/2012 | Holt et al. |
| 2012/0311395 A1 | 12/2012 | Leggette et al. |
| 2012/0317234 A1 | 12/2012 | Bohrer et al. |
| 2012/0321052 A1 | 12/2012 | Morrill et al. |
| 2013/0013564 A1 | 1/2013 | Ben-Or et al. |
| 2013/0047187 A1 | 2/2013 | Frazier et al. |
| 2013/0054822 A1 | 2/2013 | Mordani et al. |
| 2013/0067159 A1 | 3/2013 | Mehra |
| 2013/0067187 A1 | 3/2013 | Moss et al. |
| 2013/0088501 A1 | 4/2013 | Fell |
| 2013/0097470 A1 | 4/2013 | Hwang et al. |
| 2013/0145208 A1 | 6/2013 | Yen et al. |
| 2013/0238932 A1 | 9/2013 | Resch |
| 2013/0246876 A1 | 9/2013 | Manssour et al. |
| 2013/0290482 A1 | 10/2013 | Leggette |
| 2013/0305365 A1 | 11/2013 | Rubin et al. |
| 2014/0040417 A1 | 2/2014 | Galdwin et al. |
| 2014/0064048 A1 | 3/2014 | Cohen et al. |
| 2014/0115182 A1 | 4/2014 | Sabaa et al. |
| 2014/0122745 A1 | 5/2014 | Singh et al. |
| 2014/0149794 A1 | 5/2014 | Shetty et al. |
| 2014/0164430 A1 | 6/2014 | Hadjieleftheriou et al. |
| 2014/0164694 A1 | 6/2014 | Storer |
| 2014/0172930 A1 | 6/2014 | Molaro et al. |
| 2014/0250450 A1 | 9/2014 | Yu et al. |
| 2014/0280375 A1 | 9/2014 | Rawson et al. |
| 2014/0281804 A1 | 9/2014 | Resch |
| 2014/0297955 A1 | 10/2014 | Yamazaki et al. |
| 2014/0304460 A1 | 10/2014 | Carlson, Jr. et al. |
| 2014/0331100 A1 | 11/2014 | Dhuse et al. |
| 2014/0351633 A1 | 11/2014 | Grube et al. |
| 2014/0358972 A1 | 12/2014 | Guarrieri et al. |
| 2014/0359244 A1 | 12/2014 | Chambliss et al. |
| 2014/0380088 A1 | 12/2014 | Bennett et al. |
| 2014/0380125 A1 | 12/2014 | Calder et al. |
| 2014/0380126 A1 | 12/2014 | Yekhanin et al. |
| 2015/0006846 A1 | 1/2015 | Youngworth |
| 2015/0074065 A1 | 3/2015 | Christ et al. |
| 2015/0112951 A1 | 4/2015 | Narayanamurthy et al. |
| 2015/0134626 A1 | 5/2015 | Theimer et al. |
| 2015/0142863 A1 | 5/2015 | Yuen et al. |
| 2015/0160872 A1* | 6/2015 | Chen .................. G06F 3/0607 711/114 |
| 2015/0178007 A1 | 6/2015 | Moisa et al. |
| 2015/0186043 A1 | 7/2015 | Kesselman et al. |
| 2015/0254150 A1 | 9/2015 | Gordon et al. |
| 2015/0269025 A1 | 9/2015 | Krishnamurthy et al. |
| 2015/0303949 A1 | 10/2015 | Jafarkhani et al. |
| 2015/0331766 A1 | 11/2015 | Sarfare et al. |
| 2015/0370656 A1 | 12/2015 | Tsafrir et al. |
| 2015/0378542 A1 | 12/2015 | Saito et al. |
| 2016/0011935 A1 | 1/2016 | Luby |
| 2016/0011936 A1 | 1/2016 | Luby |
| 2016/0055054 A1 | 2/2016 | Patterson, III et al. |
| 2016/0085645 A1* | 3/2016 | Buzzard ............. G06F 11/2092 714/6.21 |
| 2016/0162378 A1 | 6/2016 | Garlapati et al. |
| 2016/0169692 A1 | 6/2016 | Gupta |
| 2016/0170668 A1 | 6/2016 | Mehra |
| 2016/0217104 A1 | 7/2016 | Kamble et al. |
| 2016/0232055 A1 | 8/2016 | Vairavanathan et al. |
| 2016/0239384 A1 | 8/2016 | Slik |
| 2016/0253400 A1 | 9/2016 | McAlister et al. |
| 2016/0277497 A1 | 9/2016 | Bannister et al. |
| 2016/0292429 A1 | 9/2016 | Bannister et al. |
| 2016/0294419 A1 | 10/2016 | Sandell et al. |
| 2016/0328295 A1 | 11/2016 | Baptist et al. |
| 2016/0357443 A1 | 12/2016 | Li et al. |
| 2016/0357649 A1 | 12/2016 | Karrotu et al. |
| 2016/0371145 A1 | 12/2016 | Akutsu et al. |
| 2016/0378624 A1 | 12/2016 | Jenkins, Jr. et al. |
| 2016/0380650 A1 | 12/2016 | Calder et al. |
| 2017/0003880 A1 | 1/2017 | Fisher et al. |
| 2017/0004044 A1 | 1/2017 | Tormasov et al. |
| 2017/0010944 A1 | 1/2017 | Saito et al. |
| 2017/0017671 A1 | 1/2017 | Baptist et al. |
| 2017/0031945 A1 | 2/2017 | Sarab et al. |
| 2017/0097875 A1 | 4/2017 | Jess et al. |
| 2017/0102993 A1 | 4/2017 | Hu et al. |
| 2017/0115903 A1 | 4/2017 | Franke et al. |
| 2017/0116088 A1 | 4/2017 | Anami et al. |
| 2017/0123914 A1 | 5/2017 | Li et al. |
| 2017/0153946 A1 | 6/2017 | Baptist et al. |
| 2017/0185331 A1 | 6/2017 | Gao et al. |
| 2017/0187398 A1 | 6/2017 | Trusov |
| 2017/0187766 A1 | 6/2017 | Zheng et al. |
| 2017/0206025 A1 | 7/2017 | Viswanathan |
| 2017/0206135 A1 | 7/2017 | Zeng |
| 2017/0212680 A1 | 7/2017 | Waghulde |
| 2017/0212845 A1 | 7/2017 | Conway |
| 2017/0220662 A1 | 8/2017 | Barton et al. |
| 2017/0235507 A1 | 8/2017 | Sinha et al. |
| 2017/0262187 A1 | 9/2017 | Manzanares et al. |
| 2017/0268900 A1 | 9/2017 | Nicolaas et al. |
| 2017/0272209 A1 | 9/2017 | Yanovsky et al. |
| 2017/0285952 A1 | 10/2017 | Danilov et al. |
| 2017/0286009 A1 | 10/2017 | Danilov et al. |
| 2017/0286436 A1 | 10/2017 | Neporada et al. |
| 2017/0286516 A1 | 10/2017 | Horowitz et al. |
| 2017/0288701 A1 | 10/2017 | Slik et al. |
| 2017/0344285 A1 | 11/2017 | Choi et al. |
| 2018/0052744 A1 | 2/2018 | Chen et al. |
| 2018/0063213 A1 | 3/2018 | Bevilacqua-Linn et al. |
| 2018/0074753 A1 | 3/2018 | Ober |
| 2018/0074881 A1 | 3/2018 | Burden |
| 2018/0088857 A1 | 3/2018 | Gao et al. |
| 2018/0107415 A1 | 4/2018 | Motwani et al. |
| 2018/0121286 A1 | 5/2018 | Sipos |
| 2018/0129417 A1 | 5/2018 | Sivasubramanian et al. |
| 2018/0129600 A1 | 5/2018 | Ishiyama et al. |
| 2018/0181324 A1 | 6/2018 | Danilov et al. |
| 2018/0181475 A1 | 6/2018 | Danilov et al. |
| 2018/0181612 A1 | 6/2018 | Danilov et al. |
| 2018/0217888 A1 | 8/2018 | Colgrove et al. |
| 2018/0246668 A1 | 8/2018 | Sakashita et al. |
| 2018/0267856 A1 | 9/2018 | Hayasaka et al. |
| 2018/0267985 A1 | 9/2018 | Badey et al. |
| 2018/0293017 A1 | 10/2018 | Curley et al. |
| 2018/0306600 A1 | 10/2018 | Nicolaas et al. |
| 2018/0307560 A1 | 10/2018 | Vishnumolakala et al. |
| 2018/0341662 A1 | 11/2018 | He |
| 2018/0375936 A1 | 12/2018 | Chirammal et al. |
| 2019/0028179 A1 | 1/2019 | Kalhan |
| 2019/0034084 A1 | 1/2019 | Nagarajan et al. |
| 2019/0043201 A1 | 2/2019 | Strong et al. |
| 2019/0043351 A1 | 2/2019 | Yang et al. |
| 2019/0050301 A1 | 2/2019 | Juniwal et al. |
| 2019/0065092 A1 | 2/2019 | Shah et al. |
| 2019/0065310 A1 | 2/2019 | Rozas |
| 2019/0102103 A1 | 4/2019 | Ari et al. |
| 2019/0114223 A1 | 4/2019 | Pydipaty et al. |
| 2019/0129644 A1 | 5/2019 | Gao et al. |
| 2019/0188079 A1* | 6/2019 | Kohli .................... G06F 3/0631 |
| 2019/0205437 A1 | 7/2019 | Larson et al. |
| 2019/0215017 A1 | 7/2019 | Danilov et al. |
| 2019/0220207 A1 | 7/2019 | Lingarajappa |
| 2019/0342418 A1 | 11/2019 | Eda et al. |
| 2019/0356416 A1 | 11/2019 | Yanovsky et al. |
| 2019/0384500 A1 | 12/2019 | Danilov et al. |
| 2019/0386683 A1 | 12/2019 | Danilov et al. |
| 2020/0004447 A1 | 1/2020 | Danilov et al. |
| 2020/0026810 A1 | 1/2020 | Subramaniam et al. |
| 2020/0034339 A1 | 1/2020 | Gershaneck et al. |
| 2020/0034471 A1 | 1/2020 | Danilov et al. |
| 2020/0042178 A1 | 2/2020 | Danilov et al. |
| 2020/0050510 A1 | 2/2020 | Chien et al. |
| 2020/0104377 A1 | 4/2020 | Earnesty, Jr. et al. |
| 2020/0117547 A1 | 4/2020 | Danilov et al. |
| 2020/0117556 A1 | 4/2020 | Zou et al. |
| 2020/0145511 A1 | 5/2020 | Gray et al. |
| 2020/0151353 A1 | 5/2020 | Struttmann |
| 2020/0204198 A1 | 6/2020 | Danilov et al. |
| 2021/0019067 A1 | 1/2021 | Miller et al. |

(56) References Cited

U.S. PATENT DOCUMENTS

| | | |
|---|---|---|
| 2021/0019093 A1 | 1/2021 | Karr et al. |
| 2021/0019237 A1 | 1/2021 | Karr et al. |
| 2021/0034268 A1 | 2/2021 | Hara et al. |
| 2021/0096754 A1 | 4/2021 | Danilov et al. |
| 2021/0132851 A1 | 5/2021 | Danilov et al. |
| 2021/0133049 A1 | 5/2021 | Danilov et al. |
| 2021/0218420 A1 | 7/2021 | Danilov et al. |
| 2021/0255791 A1 | 8/2021 | Shimada et al. |
| 2021/0273660 A1 | 9/2021 | Danilov et al. |

OTHER PUBLICATIONS

Non-Final Office Action received for U.S. Appl. No. 16/261,547 dated Sep. 3, 2020, 26 pages.
Non-Final Office Action received for U.S. Appl. No. 16/261,548 dated Aug. 21, 2020, 42 pages.
Notice of Allowance received for U.S. Appl. No. 16/261,549 dated Jul. 17, 2020, 40 pages.
Qiang et al., "Dynamics Process of Long-running Allocation/Collection in Linear Storage Space", International Conference on Networking, Architecture, and Storage (NAS 2007), Guilin, 2007, pp. 209-216.
Non-Final Office Action received for U.S. Appl. No. 16/374,725 dated Aug. 19, 2020, 50 pages.
Non-Final Office Action received for U.S. Appl. No. 16/511,161 dated Jul. 10, 2020, 24 pages.
Notice of Allowance received for U.S. Appl. No. 15/862,547 dated Mar. 29, 2019 27 pages.
Non-Final Office Action received for U.S. Appl. No. 15/792,714 dated Apr. 4, 2019, 20 pages.
Final Office Action received for U.S. Appl. No. 15/792,714 dated Sep. 12, 2019, 43 pages.
Wikipedia "Garbage Collection", URL: https://en.wikipedia.org/wiki/Garbage_collection_(computer science) #Availability (Year: 2017) retrieved using the WayBackMachine, Sep. 8, 2017, 8 pages.
Wikipedia "Erasure code", URL: https://web.archive.org/web/20170908171158/https://en.wikipedia.org/wiki/Erasure_code (Year: 2017), retrieved using the WayBackMachine, Sep. 8, 2017, 5 pages.
Wikipedia "Front and back ends" URL: https://en.wikipedia.org/wiki/Front_and_back_ends (Year:2019), Sep. 6, 2019, 4 pages.
Notice of Allowance received for U.S. Appl. No. 15/792,714 dated Nov. 8, 2019, 31 pages.
Non-Final Office Action received for U.S. Appl. No. 15/791,390 dated Sep. 20, 2019, 27 pages.
Final Office Action received for U.S. Appl. No. 15/791,390 dated Feb. 6, 2020, 29 pages.
Non-Final Office Action received for U.S. Appl. No. 15/791,390 dated Apr. 30, 2020, 48 pages.
Huang et al., "Scale-RS: An Efficient Scaling Scheme for RS-Coded Storage Clusters," in IEEE Transactions on Parallel and Distributed Systems, vol. 26, No. 6, pp. 1704-1717, Jun. 1, 2015.
Non-Final Office Action received for U.S. Appl. No. 16/457,615 dated Jul. 20, 2020, 34 pages.
Non-Final Office Action received for U.S. Appl. No. 15/651,504 dated Mar. 21, 2019, 10 pages.
Non-Final Office Action received for U.S. Appl. No. 15/662,273 dated Nov. 16, 2018, 19 pages.
Final Office Action received for U.S. Appl. No. 15/662,273 dated May 15, 2019, 33 pages.
Non-Final Office Action received for U.S. Appl. No. 15/965,479 dated Apr. 15, 2019, 21 pages.
Non-Final Office Action received for U.S. Appl. No. 15/794,950 dated Jul. 9, 2019, 29 pages.
Final Office Action received for U.S. Appl. No. 15/651,504 dated Sep. 18, 2019, 15 pages.
Non-Final Office Action received for U.S. Appl. No. 15/952,179 dated Sep. 10, 2019, 42 pages.
Wikipedia, "Standard Raid Levels—RAID 6", URL: https://en.wikipedia.org/wiki/Standard_RAID_levels#RAID_6, Oct. 18, 2019, 11 pages.
Non-Final Office Action received for U.S. Appl. No. 15/656,382 dated Nov. 1, 2019, 47 pages.
Final Office Action received for U.S. Appl. No. 15/952,179 dated Nov. 26, 2019, 53 pages.
Non Final Office Action received for U.S. Appl. No. 16/024,314 dated Nov. 25, 2019, 42 pages.
Non-Final Office Action received for U.S. Appl. No. 16/177,278 dated Dec. 2, 2019, 55 pages.
Non-Final Office Action received for U.S. Appl. No. 15/651,504 dated Dec. 31, 2019, 18 pages.
Non-Final Office Action received for U.S. Appl. No. 16/010,246 dated Dec. 5, 2019, 67 pages.
Stonebreaker et al. "Distributed RAID—A New Multiple Copy Algorithm.", IEEE ICDE, 1990, pp. 430-437.
Muralidhar et al. "4: Facebook's Warm BLOB Storage System", USENIX. OSDI, Oct. 2014, pp. 383-398.
Final Office Action dated Feb. 12, 2020 for U.S. Appl. No. 16/024,314, 29 pages.
Non-Final Office Action received for U.S. Appl. No. 16/010,255 dated Jan. 9, 2020, 31 pages.
Office Action dated Feb. 5, 2020 for U.S. Appl. No. 16/261,551, 30 pages.
Non-Final Office Action received for U.S. Appl. No. 16/228,612 dated Feb. 27, 2020, 49 pages.
Final Office Action received for U.S. Appl. No. 16/010,246 dated Mar. 16, 2020, 33 pages.
Final Office Action received for U.S. Appl. No. 15/656,382 dated Apr. 6, 2020, 31 pages.
Non-Final Office Action received for U.S. Appl. No. 15/582,167 dated Sep. 7, 2018, 19 pages.
Non-Final Office Action received for U.S. Appl. No. 15/952,179 dated Apr. 20, 2020, 68 pages.
Notice of Allowance received for U.S. Appl. No. 16/240,193, dated May 4, 2020, 46 pages.
Final Office Action received for U.S. Appl. No. 16/177,278, dated May 11, 2020, 53 pages.
Non-Final Office Action received for U.S. Appl. No. 16/231,018 dated May 8, 2020, 78 pages.
Notice of Allowance dated May 11, 2020 for U.S. Appl. No. 16/240,193, 24 pages.
Non-Final Office Action received for U.S. Appl. No. 16/228,624 dated Jun. 24, 2020, 65 pages.
Non-Final Office Action received for U.S. Appl. No. 16/240,272 dated Jun. 29, 2020, 64 pages.
Non-Final Office Action received for U.S. Appl. No. 16/228,612 dated Jun. 29, 2020, 62 pages.
Non-Final Office Action received for U.S. Appl. No. 16/399,897 dated Feb. 19, 2021, 56 pages.
Non-Final Office Action received for U.S. Appl. No. 16/670,715 dated Mar. 31, 2021, 60 pages.
Final Office Action received for U.S. Appl. No. 16/177,278 dated Feb. 24, 2021, 109 pages.
EMC; "EMC ECS (Elastic Cloud Storage) Architectural Guide v2.x;" EMC; Jun. 2015; available at: https://www.dell.com/community/s/vjauj58549/attachments/vjauj58549/solutions-ch/477 /1/h14071-ecs-architectural-guide-wp.pdf, Jun. 2015, 21 pages.
Mohan et al., "Geo-aware erasure coding for high-performance erasure-coded storage clusters", Springer Link, URL: https://link.springer.com/article/10.1007/s 12243-017-0623-2, Jan. 18, 2018.
Final Office Action received for U.S. Appl. No. 16/179,486 dated Jan. 28, 2021, 55 pages.
Non-Final Office Action received for U.S. Appl. No. 16/670,746 dated Feb. 16, 2021, 55 pages.
Dell Technologies, "ECS Overview and Architecture", h14071.18, Feb. 2021, 55 Pages.
Non-Final Office Action received for U.S. Appl. No. 16/177,285 dated Apr. 9, 2021, 41 pages.
Non-Final Office Action received for U.S. Appl. No. 16/779,208 dated Apr. 20, 2021, 71 pages.

(56) References Cited

OTHER PUBLICATIONS

Final Office Action received for U.S. Appl. No. 16/010,255 dated Jul. 23, 2020, 36 pages.
Office Action received for U.S. Appl. No. 16/010,246 dated Jul. 27, 2020 36 pages.
Office Action received for U.S. Appl. No. 16/177,278, dated Aug. 21, 2020, 53 pages.
Office Action received for U.S. Appl. No. 16/179,486, dated Aug. 13, 2020, 64 pages.
Guo et al., "GeoScale: Providing Geo-Elasticity in Distributed Clouds" 2016 IEEE International Conference on Cloud Engineering, 4 pages.
Guo et al., "Providing Geo-Elasticity in Geographically Distributed Clouds". ACM Transactions on Internet Technology, vol. 18, No. 3, Article 38. Apr. 2018. 27 pages.
Office Action received for U.S. Appl. No. 16/254,073, dated Aug. 18, 2020, 62 pages.
Non-Final Office Action received for U.S. Appl. No. 16/209,185 dated Jun. 18, 2020, 22 pages.
Martin Hosken, Developing a Hyper-Converged Storage Strategy for VMware vCloud Director with VMware vSAN, Jan. 2018 (Year 2018).
Non-Final Office Action received for U.S. Appl. No. 16/261,549 dated Apr. 15, 2020, 22 pages.
Non-Final Office Action received for U.S. Appl. No. 16/374,726 dated Jun. 2, 2020, 47 pages.
Matarajan, RAID 0, RAID 1, RAID 5, RAID 10 Explained with Diagrams, Aug. 10, 2010, thegeekstuff.com (18 pages).
Notice of Allowance received for U.S. Appl. No. 16/726,428 dated Jun. 14, 2021, 34 pages.
Non-Final Office Action received for U.S. Appl. No. 16/698,096 dated May 24, 2021, 62 pages.
Non-Final Office Action received for U.S. Appl. No. 16/745,855 dated May 13, 2021, 71 pages.
Non-Final Office Action received for U.S. Appl. No. 16/834,649 dated Jun. 24, 2021, 61 pages.
Non-Final Office Action received for U.S. Appl. No. 16/179,486 dated May 12, 2021, 50 pages.
Non-Final Office Action received for U.S. Appl. No. 16/570,657 dated May 12, 2021, 79 pages.
Non-Final Office Action received for U.S. Appl. No. 16/670,765 dated Jul. 20, 2021, 79 pages.
Thomasian et al., "Hierarchical RAID: Design, performance, reliability, and recovery", J. Parallel Distrib. Comput. vol. 72 (2012) pp. 1753-1769.
Non-Final Office Action received for U.S. Appl. No. 16/526,142 dated Oct. 15, 2020, 21 pages.
Notice of Allowance received U.S. Appl. No. 16/228,612 dated Oct. 20, 2020, 84 pages.
Zhou, et al. "Fast Erasure Coding for Data Storage: A Comprehensive Study of the Acceleration Techniques" Proceedings of the 17th Usenix Conference on File and Storage Technologies (FAST '19), [https://www.usenix.org/conference/fast19/presentation/zhou], Feb. 2019, Boston, MA, USA. 14 pages.
Non-Final Office Action received for U.S. Appl. No. 16/010,255 dated Oct. 29, 2020, 65 pages.
Final Office Action received for U.S. Appl. No. 16/240,272 dated Oct. 27, 2020, 42 pages.
Non-Final Office Action received for U.S. Appl. No. 16/399,902 dated Oct. 28, 2020, 83 pages.
Notice of Allowance received for U.S. Appl. No. 16/374,726 dated Nov. 20, 2020, 78 pages.
Final Office Action received for U.S. Appl. No. 16/228,624 dated Dec. 1, 2020, 63 pages.
Non-Final Office Action received for U.S. Appl. No. 16/570,657 dated Nov. 27, 2020, 75 pages.
Final Office Action received for U.S. Appl. No. 16/177,285 dated Dec. 30, 2020, 61 pages.
Final Office Action received for U.S. Appl. No. 16/511,161 dated Dec. 30, 2020, 61 pages.
Non-Final Office Action received for U.S. Appl. No. 16/399,895 dated Jan. 4, 2021, 64 pages.
Notice of Allowance received for U.S. Appl. No. 16/374,726 dated Jan. 6, 2021, 56 pages.
Office Action dated Apr. 13, 2021 for U.S. Appl. No. 16/781,316, 21 pages.
Non-Final Office Action received for U.S. Appl. No. 16/670,715 dated Jan. 5, 2022, 22 pages.
Non-Final Office Action received for U.S. Appl. No. 16/834,649 dated Jan. 28, 2022, 26 pages.
Office Action dated Feb. 8, 2022 for U.S. Appl. No. 16/986,222, 62 pages.
Office Action dated Nov. 24, 2021 for U.S. Appl. No. 16/538,984, 30 pages.
Non-Final Office Action received for U.S. Appl. No. 16/698,096 dated Jan. 5, 2022, 21 pages.
Notice of Allowance received for U.S. Appl. No. 16/570,657 dated Sep. 7, 2021, 65 pages.
Ma et al., "An Ensemble of Replication and Erasure Codes for Cloud File Systems", Proceedings—IEEE INFOCOM, Apr. 2013, pp. 1276-1284.
Final Office Action received for U.S. Appl. No. 16/698,096 dated Sep. 7, 2021, 24 pages.
Final Office Action received for U.S. Appl. No. 16/177,285 dated Sep. 14, 2021, 65 pages.
Final Office Action received for U.S. Appl. No. 16/670,715 dated Sep. 7, 2021, 35 pages.
Final Office Action received for U.S. Appl. No. 16/179,486 dated Oct. 20, 2021, 46 pages.
Notice of Allowance dated Sep. 10, 2021 for U.S. Appl. No. 16/745,855, 30 pages.
Notice of Allowance dated Nov. 22, 2021 for U.S. Appl. No. 16/888,144, 71 pages.
Non-Final Office Action received for U.S. Appl. No. 16/584,800 dated Mar. 3, 2022, 90 pages.
Non-Final Office Action received for U.S. Appl. No. 16/403,417 dated Feb. 25, 2022, 100 pages.
Non-Final Office Action received for U.S. Appl. No. 17/153,602 dated Mar. 16, 2022, 40 pages.
Notice of Allowance received for U.S. Appl. No. 17/333,793 dated Mar. 9, 2022, 39 pages.
Sun et al., "Data Management across Geographically-Distributed Autonomous Systems: Architecture, Implementation, and Performance Evaluation," IEEE Transactions on Industrial Informatics, 2019, 9 pages.
Notice of Allowance dated Jun. 27, 2022 for U.S. Appl. No. 16/584,800, 33 pages.
Office Action dated Jun. 17, 2022 for U.S. Appl. No. 16/986,222, 76 pages.
Office Action dated Jul. 14, 2022 for U.S. Appl. No. 17/153,602, 34 pages.
Office Action dated Jun. 1, 2022 for U.S. Appl. No. 16/538,984, 114 pages.
Notice of Allowance dated Jun. 27, 2022 for U.S. Appl. No. 17/333,815, 10 pages.
Notice of Allowance dated Jun. 8, 2022 for U.S. Appl. No. 16/179,486, 67 pages.

* cited by examiner

MITIGATING REAL NODE FAILURE OF A DOUBLY MAPPED REDUNDANT ARRAY OF INDEPENDENT NODES

TECHNICAL FIELD

The disclosed subject matter relates to data storage, more particularly, to mitigation of a failure of a real node in relation to a corresponding doubly mapped redundant array of independent nodes of a mapped data storage system.

BACKGROUND

Conventional data storage techniques can store data in one or more arrays of data storage devices. As an example, data can be stored in an ECS (formerly known as ELASTIC CLOUD STORAGE) system, hereinafter an ECS system, such as is provided by DELL EMC. The example ECS system can comprise data storage devices, e.g., disks, etc., arranged in nodes, wherein hardware nodes, e.g., real nodes, etc., can be comprised in an ECS cluster, e.g., an N×M ECS cluster comprising N hardware nodes each having M real disks. One use of data storage is in bulk data storage. Data can conventionally be stored in a 'group of nodes' format for a given cluster, for example, in a conventional ECS system, all disks of nodes comprising the group of nodes, e.g., ECS cluster, etc., are considered part of the group. As such, a group with nodes having many disks can, in some conventional embodiments, comprise a large amount of storage, much of which can go underutilized. As an example, a storage group of five nodes, with ten disks per node, at 8 terabytes (TBs) per disk is roughly 400 TB in size, which can be excessively large for some types of data storage. Additionally, apportioning smaller real groups, e.g., groups having fewer real nodes, groups having real nodes with fewer real disks, groups having real nodes with smaller real disks, etc., can be inefficient in regards to processor, network, storage resources, etc., e.g., computer resource usage, to support these smaller groups. As such, it can be desirable to provide logical storage groups, and corresponding hardware, software, firmware, etc., at a more granular level to employ portions of larger real groups, thereby promoting more efficient computer resource usage, e.g., retaining a large real group(s) but providing a smaller logical group(s) that can be more suitable for storing some types of data, e.g., smaller amounts of data, slower access to data, etc., that otherwise can be inefficient to store in the example large real group(s). Further, it can be desirable to provide storage space to recover from portions of the real storage cluster becoming less accessible.

DETAILED DESCRIPTION

Figure 1:
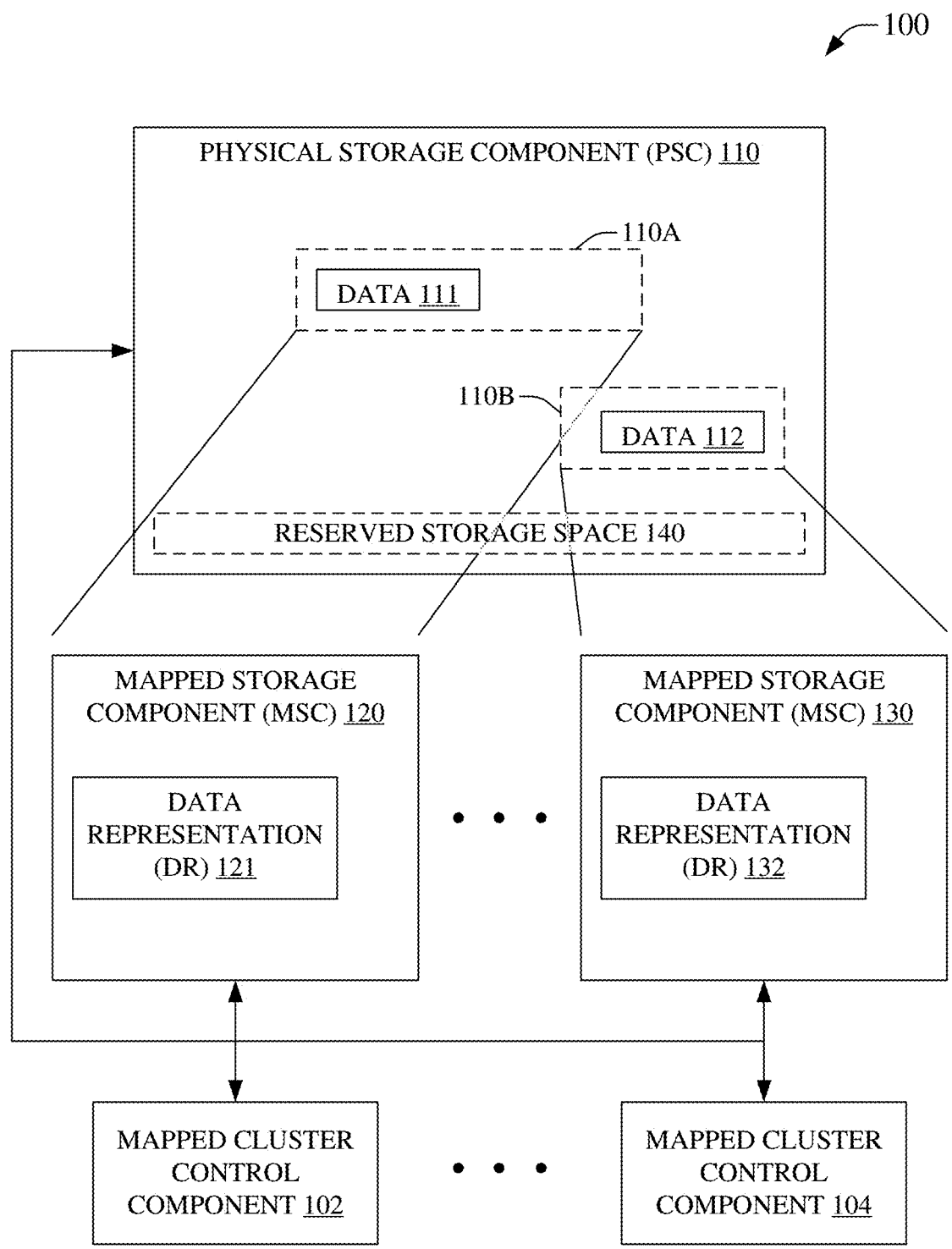
FIG. 1 is an illustration of an example system that can facilitate mitigation of a real node failure, by reserving real storage space, relative to a singly or doubly mapped redundant array of independent nodes, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Data storage techniques can conventionally store data in one or more arrays of data storage devices. As an example, data can be stored in an ECS system such as is provided by DELL EMC. The example ECS system can comprise data storage devices, e.g., disks, etc., arranged in nodes, wherein nodes can be comprised in a redundant array of independent nodes (RAIN), also known as an ECS cluster, referred to herein as a 'real RAIN,' 'real cluster,' 'cluster,' etc. One use of data storage is in bulk data storage. Data can conventionally be stored in a real cluster, for example, in a conventional ECS system, a real cluster comprises all disks of the nodes comprised in the real cluster. As such, a real cluster having node(s) with many disks can, in some conventional embodiments, present a very large amount of storage, which, for some storage applications, can be underutilized. As such, it can be desirable to provide smaller amounts of storage while still being able to deploy large real clusters. This can be accomplished via logically apportioning portions of a real cluster into smaller clusters, e.g., a 'mapped redundant array of independent nodes,' hereinafter referred to as a 'mapped RAIN,' 'mapped cluster,' etc. A real node can be a hardware node, a hardware software node, a virtual node executing on hardware that can support a real node, etc.

In an embodiment of the presently disclosed subject matter, a doubly mapped redundant array of independent nodes, hereinafter a doubly mapped RAIN, doubly mapped cluster, etc., can comprise a logical data storage arrangement corresponding to data stored on real storage devices. In a doubly mapped cluster, a real cluster(s), e.g., a group of real storage devices comprised in one or more hardware nodes, hardware/software nodes, virtual nodes executing on hardware, etc., comprised in one or more real clusters, can be defined to allow more granular use of the real cluster in contrast to conventional storage techniques. In an aspect, a doubly mapped cluster can comprise doubly mapped nodes that can provide data redundancy, which, in an aspect, can allow for failure of a portion of one or more doubly mapped nodes of the doubly mapped cluster without loss of access to stored data, can allow for removal/addition of one or more doubly mapped nodes from/to the doubly mapped cluster without loss of access to stored data, etc. As an example, a doubly mapped cluster can comprise doubly mapped nodes having a data redundancy scheme analogous to a redundant array of independent disks (RAID) type-6, e.g., RAID6, also known as double-parity RAID, etc., wherein employing a node topology and two parity stripes on each node can allow for two node failures before any data of the doubly mapped cluster becomes inaccessible, etc. In other example embodiments, a doubly mapped cluster can employ other node topologies and parity techniques to provide data redundancy, e.g., analogous to RAID0, RAID1, RAID2, RAID3, RAID4, RAID5, RAID6, RAID0+1, RAID1+0, etc., wherein a doubly mapped node of a doubly mapped cluster can comprise one or more disks, and the doubly mapped node can be supported on one or more extents of one or more real disks in a real cluster storage system. Unlike RAID technology, an example doubly mapped RAIN system can provide access to more granular storage in generally very large data storage systems, often on the order of terabytes, petabytes, exabytes, zettabytes, etc., or even larger, because each doubly mapped node can generally comprise a plurality of extents of some real disks, unlike conventional RAID technologies.

In an aspect, one or more mapped clusters and/or doubly mapped clusters can be built upon a real cluster(s). As examples of mapped clusters, a mapped cluster can logically comprise all disks of all nodes of a real cluster(s) resulting a mapped cluster that is the same size as the real cluster(s), a first mapped cluster can use some nodes of a real cluster(s) and a second mapped cluster can use other nodes of the real cluster(s), a first mapped cluster can use some disks of the nodes of the real cluster and a second mapped cluster can use other disks of the nodes of the real cluster, a first mapped cluster can use some disks of some nodes of the real cluster and a second mapped cluster can use other disks of other nodes of the real cluster, etc. As examples of doubly mapped clusters, a doubly mapped cluster can logically comprise all disks of all nodes of a real cluster(s) resulting a doubly mapped cluster that is the same size as the real cluster(s), a first doubly mapped cluster can use some extents of real nodes of a real cluster(s) and a second doubly mapped cluster can use other extents of real nodes of the real cluster(s), a first doubly mapped cluster can use some disks of some nodes of the real cluster and a second doubly mapped cluster can use other disks of other nodes of the real cluster, a first doubly mapped cluster can use some disks of some nodes of the real cluster and a second doubly mapped cluster can use other disks of other nodes of the real cluster, a first doubly mapped cluster can use some extents of some disks of some nodes of the real cluster and a second mapped cluster can use other extents of other disks of other nodes of the real cluster, etc. It is to be noted that the extents, disks, and nodes of the real cluster allocated to any singly or doubly mapped cluster need not be contiguous in the real cluster(s). Similarly, the singly or doubly mapped disks of the singly or doubly mapped cluster also need not be contiguous. It is to be noted that not all data storage space of the real cluster needs to be apportioned into singly and/or doubly mapped clusters, and rather, singly and/or doubly mapped clusters can employ some, none, or all of the data storage space of one or more real clusters. The disclosed mapped RAIN technology can provide smaller logical groups that can be used more efficiently for storing smaller amounts of data in contrast to storing the same data without mapping, e.g., directly in a real redundant array of independent nodes. Moreover, singly and doubly mapped nodes can be employed in the same real cluster(s). As such, a singly and/or doubly mapped cluster can provide finer granularity of the data storage system. As an example, where the real cluster is 8×8, e.g., 8 nodes by 8 disks in each node (64 disk pool), then, for example, four mapped 4×4 clusters can be provided, wherein each of the four mapped 4×4 clusters is approximately ¼th the size of the real cluster, e.g., 16 disk pool for each mapped cluster. As a second example, given an 8×8 real cluster, 16 mapped 2×2 clusters can be provided where each mapped cluster is approximately ¹⁄₁₆th the size of the real cluster, e.g., each mapped cluster can comprise a 4 disk pool. As a third example, for the 8×8 real cluster, 2 mapped 4×8 or 8×4 clusters can be provided and each can be approximately ½ the size of the real cluster. As a fourth example, where the real cluster is 8×8×8, e.g., 8 nodes by 8 disks by 8 extents per disk in each node (64 disk pool supporting a 512 extent pool), for the 8×8×8 real cluster, two doubly mapped 4×8×8 (256 extents) or 8×4×8 (256 extents) clusters can be provided and each can be approximately ½ the size of the real cluster, etc. Additionally, the example 8×8 real cluster (64 disks of capacity) or the 8×8×8 real cluster (64 disks of capacity in 512 extents) can provide a mix of different sized mapped clusters, for example: one 8×4 mapped cluster (32 disks in capacity), one 4×4 mapped cluster (16 disks in capacity) and four 2×2 mapped clusters (each four disks in capacity), e.g., 64=32+16+4(4); two 8×4×4 doubly mapped clusters (each 32 disks in capacity and comprised of 128 extents) e.g., 64=2(32); one 4×4×8 doubly mapped cluster (16 disks in capacity and comprised of 128 extents), and twelve 2×2×2 doubly mapped clusters (each four disks in capacity and each comprised of eight extents) e.g., 64=16+12(4); etc.

In an aspect, doubly mapped RAIN and singly mapped RAIN technology can be parallel in many aspects, excepting that the mapped RAIN can generally operate at a disk/node/cluster level and that a doubly mapped RAIN can generally operate at an extent/disk/node/cluster level, therefore, in the following description, the terms 'mapped RAIN,' 'mapped node,' 'mapped cluster,' etc., is to be regarded as referring to either a singly mapped or doubly mapped RAIN, node, cluster, etc., wherein it is further noted that a real disk, real node, real cluster, etc., can support said singly or doubly mapped RAIN, node, cluster, etc., unless explicitly or implicitly noted otherwise. As such, a mapped RAIN can, e.g., a singly mapped RAIN and/or a doubly mapped RAIN, in some embodiments, can comprise a processor, a virtual processor executing on a real processor, a combination of real processors and virtual processors, etc., that can enable interaction with data "stored in a mapped cluster," e.g., stored on a real cluster in accordance with a mapped cluster abstraction, mapping, etc. In an aspect, the data stored in a mapped cluster can actually be stored on a portion of a disk, or an extent of a disk, of a node of a real cluster, but can be interacted with according to a logical relation to a representation said to be 'stored in the mapped cluster.' As such, writing data into an address of the mapped cluster can result in writing of the data into an address of the real cluster and association between the mapped cluster address and the real cluster address can be retained to allow interaction with the data. In an aspect, the retention of the real-to-mapped address relationship, e.g., mapped data corresponding to the real data, can be via nearly any technique, for example, via a mapping table, via a data structure, etc., and all such techniques are within the scope of the present disclosure. Additionally, the relationship is typically updatable. This can allow, for example, movement of data at the real cluster to still be related to an unchanged mapped address, e.g., the relationship can be updated without the change being apparent to a user of the mapped cluster, etc., As another example, this can allow movement of the mapped data, wherein the 'moved mapped data' can still relate to unmoved data at a real storage component address. Numerous other examples are readily appreciated and are considered within the scope of the instant disclosure even where not explicitly recited for the sake of clarity and brevity, for example, where a node of a real cluster fails, the relationship to the mapped address can be updated to associate a redundant duplicate of the data of the real cluster to be associated with the mapped address, thereby allowing a user of the mapped cluster to operate on the data without disturbance or, in some embodiments, without even becoming aware of the failover to the redundant data, etc.

In an embodiment, software, firmware, etc., can present a representation of storage space that can hide abstraction of mapped storage components in a mapped RAIN system, e.g., a group of doubly mapped nodes can appear to a client device to be a contiguous block of data storage even where, for example, it can be spread across multiple extents of one or more real disks, multiple real groups of hardware nodes (a real RAIN), multiple real clusters of hardware nodes (multiple real RAINs), multiple geographic locations, etc. For a given real cluster, e.g., real RAIN, that is N nodes wide by M disks deep by L extents per real disk, a doubly mapped RAIN can consist of up to N' mapped nodes of M' mapped disks having L' mapped extents. Accordingly, in an embodiment, one doubly mapped node can be expected to manage extents of disks of different real nodes. Similarly, in an embodiment, extents of disks of one real node can be understood to be manageable by doubly mapped nodes of different doubly mapped RAIN clusters. In some embodiments, the use of disks from one real node by two doubly mapped nodes of one doubly mapped cluster can be prohibited, which can harden doubly mapped RAIN clusters against a failure of one real node compromising two or more doubly mapped nodes of the doubly mapped RAIN cluster, e.g., a data loss event, etc. In some embodiments, the use of extents from one real disk by two doubly mapped disks of one doubly mapped cluster can be prohibited, similarly, to harden doubly mapped RAIN clusters against a failure of one real disk compromising two or more doubly mapped disks of the doubly mapped RAIN cluster. Hereinafter, an extent of a real disk can be comprised in a real node that can be comprised in a real cluster and, furthermore, the extent of the real disk can correspond to a portion of a doubly mapped disk, a doubly mapped disk can correspond to one or more extents of one or more real disks, a doubly mapped node can correspond to one or more portions of one or more real nodes, a doubly mapped cluster can correspond to one or more portions of one or more real clusters, etc., and, for convenience, the term RAIN can be omitted for brevity, e.g., a doubly mapped RAIN cluster can be referred to simply as a doubly mapped cluster, etc., Moreover, a doubly mapped RAIN node can simply be referred to as a doubly mapped node, etc., wherein 'mapped' is intended to convey a distinction between a logical representation of data from corresponding real data stored on a physical hardware component, wherein the real data and the doubly mapped data are related and have a defined relationship, e.g., the logical representation of data, for example, a data representation, 'DR,' etc., can be stored in a non-volatile manner and can be related to real data stored on a physical storage device(s), wherein the relationship can allow a client device to operate on the DR to cause corresponding operation on the real data. As an example, a DR can comprise a logical storage address for a datum and a mapping to a real storage address of the datum such that an operation directed to the logical address is performed on the datum at the real storage address, etc.

In an embodiment, a doubly mapped cluster can correspond to a real cluster, e.g., the doubly mapped cluster can be N' by M' by L' in size and the real cluster can be N by M by L in size. It is noted that N' generally should not exceed N because where N'>N the prohibition against using disks of one real node in more than one doubly mapped node of a doubly mapped cluster must be violated. However, it is further noted that M' can be any number of logical disks, even exceeding M, for example, a 4×4×4 real cluster can be mapped to a 2×8×4 doubly mapped cluster, etc. Similarly, it is noted that L' can be any number of extents, for example, a 4×4×4 real cluster can be mapped by a 2×4×8 doubly mapped cluster, etc. In other embodiments, N' can be less than, or equal to, N, M' can be less than, or equal to, M, L' can be less than or equal to L, etc. In some embodiments, a doubly mapped cluster can be the same size as a real cluster, smaller than a real cluster, etc. Additionally, in some embodiments, a real cluster can comprise more than one doubly mapped cluster, e.g., where a doubly mapped cluster is sufficiently small in comparison to a real cluster, the real cluster can accommodate one or more additional doubly mapped clusters. In an aspect, where doubly mapped cluster(s) are smaller than a real cluster, the doubly mapped cluster can provide finer granularity of the data storage system.

Other aspects of the disclosed subject matter provide additional features generally not associated with real cluster data storage. In some embodiments, a mapped cluster, e.g., singly or doubly mapped, can comprise storage space from more than one real cluster. In some embodiments, a mapped cluster can comprise storage space from real nodes in different geographical areas. In some embodiments, a mapped cluster can comprise storage space from more than one real cluster in more than one geographic location. As an example, a mapped cluster can comprise storage space from a cluster having hardware nodes in a data center in Denver. In a second example, a mapped cluster can comprise storage space from a first cluster having hardware nodes in a first data center in Denver and from a second cluster also having hardware nodes in the first data center in Denver. As a further example, a mapped cluster can comprise storage space from both a cluster having hardware nodes in a first data center in Denver and a second data center in Denver. As a further example, a mapped cluster can comprise storage space from a first real cluster having hardware nodes in a first data center in Seattle, Wash., and a second data center having hardware nodes in Tacoma, Wash. As another example, a mapped cluster can comprise storage space from a first real cluster having hardware nodes in a first data center in Houston, Tex., and a second real cluster having hardware nodes in a data center in Mosco, Russia.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate mitigation of a real node failure, by reserving real storage space, relative to a singly mapped redundant array of independent nodes or a doubly mapped redundant array of independent nodes, in accordance with aspects of the subject disclosure. System 100 can comprise physical storage component (PSC) 110. PSC 110 can comprise a real cluster, portion of a real cluster, portions of more than one real cluster, multiple clusters, etc. PSC 110 can facilitate data operations, e.g., storing data, accessing data, deleting data, moving data, copying data, duplicating data, etc. In some embodiments, PSC 110 can be part of a geographically diverse storage system. In some embodiments, PSC 110 can support data convolving storage systems, for example storing an XOR chunk that is a representation of a data from a first chunk and a second chunk in a convolved form, etc.

In an aspect, data 111 can be stored at portion 110A of PSC 110. Data 111 can be stored in a data storage element of PSC 110. In an embodiment, PSC 110 can comprise a cluster(s) comprising a node(s) comprising a storage device(s) comprising an extent(s), e.g., portion 110A can comprise an extent(s) of a real storage device(s) of a real node(s) of a real cluster(s) of PSC 110. As an example, an addressable memory cell of an extent of PSC 110 can comprise information representative of data 111. This example addressable memory cell, for example, can be comprised in a portion, e.g., an extent, etc., of a hard drive, disk, solid state storage device, optical storage medium, etc. In an aspect, portion 110A of PSC 110 can comprise the data storage element, a component comprising the data storage element, a portion of a component comprising the data storage element, portions or all of multiple components wherein they comprise the data storage element, etc. As an example, portion 110A of PSC 110 can comprise a disk that comprises an extent that comprises the data storage element that stores information representing data 111. Data 111 can be interacted with, operated on, etc., via a communicative coupling to PSC 110, to a component comprised in portion 110A, etc. As an example, PSC 110 can be a real cluster comprising real nodes that each comprise real disks comprising extents, wherein portion 110A is comprised in a portion, e.g., an extent, of the real disks, wherein the real disks comprise data storage elements, and wherein a data storage element of the data storage elements can store information representing data 111, whereby the information representing data 111 can be written into the storage element via a communicative coupling between PSC 110 and another device such that the information representing data 111 is associated with an address (or other identifier) of the data storage element enabling operations/interactions with the information representing data 111. It will be noted that the term 'data 111' can be synonymous with the term 'information representing data 111' in that, for example, binary information representing the data is conventionally regarded as data 111, for example, a photo can be data 111 and the information representing the photo can also be termed data 111, etc., and this convention is employed in the instant disclosure for clarity and brevity, although where needed distinctions between the information representing data and the data itself can be indicated where noteworthy. Additionally, as is noted herein, PSC 110 can be a large data storage space, e.g., a real cluster of many nodes each having many large disks, etc., which can result in inefficient use of the storage space for many types of storage than can be more efficiently supported by a smaller data storage space. Accordingly, mapped RAIN technology, doubly mapped RAIN technology, etc., as disclosed, can provide more granular use of PSC 110.

Mapped storage component (MSC) 120 of system 100, and similarly MSC 130, etc., can logically represent a portion of PSC 110, e.g., portion 110A, etc., in a mapped cluster, e.g., a singly or doubly mapped cluster, etc. A mapped cluster can therefore comprise a data representation (DR) of data stored in a portion of PSC 110, e.g., DR 121 can be a representation of data 111 of portion 110A of PSC 110, DR 132 can be a representation of data 112 of portion 110B of PSC 110, etc. MSC 120 can enable interactions with DR 121 that can propagate to data 111. Similarly, MSC 130 can enable interactions with DR 132 that can propagate to data 112. In some embodiments, MSC 120, 130, etc., can comprise mapped nodes having mapped disks, which can logically represent one or more portions of PSC 110, e.g., 110A, 110B, etc. A processor of MSC 120 can receive an instruction to perform an operation on DR 121, such as overwriting DR 121, etc., that can be translated by the processor and communicated to PSC 110 to cause data 111 to be overwritten. In an aspect, DR 121 can be correlated to data 111 via a mapped cluster control component, e.g., mapped cluster control component 102, mapped cluster control component 104, etc., such as via a mapping table, etc., to enable an operation directed to an address (or other identifier) of DR 121 to be translated into an operation directed to data 111 based on the correlation of DR 121 and data 111. As is noted herein, mapped RAIN can provide abstraction of one or more portions of a real cluster to enable data operations that can different levels of efficiency, speed, reliability, etc., than can be achieved by directly employing a real cluster for data operations.

In an aspect, mapped cluster control component(s), e.g., 102, 104, etc., can enable adaptation of DRs, e.g., 121, 132, etc., comprised in MSCs, e.g., 120, 130, etc., that can mitigate loss of a storage elements of PSC 110, e.g., loss of a real node, loss of a real disk, etc. In an embodiment the mitigation can substitute a storage element of reserved storage space 140 of PSC 110 to replace an inaccessible storage element of PSC 110. Accordingly, mapped cluster control component, e.g., 102, 104, etc., can facilitate adapting an affected MSC, e.g., MSC 120, 130, etc. In contrast to singly mapped RAIN that can generally substitute a reserved real disk, doubly mapped RAIN can generally substitute a reserved extent of a real disk. As an example of singly mapped RAIN, when a real node comprising two real disks becomes less accessible, two reserved real disks of other real nodes can be employed to restore access to the data comprised on the less accessible real node. In contrast, for an example doubly mapped RAIN, where a real node comprising two real disks having three extents each becomes less accessible, six other extents of other real nodes can be employed to facilitate restoration to the data comprised on the less accessible real node. In an aspect, these example reserved extents can be from any number of other real disks/nodes, e.g., from six extents from one other real disk; from six extents from two other real disks of one other real node; from three extents from a first other real disks of a first other real node and three extents from a second real disk of a second other real node; from one extent of each of six other real disks of up to six other real nodes; etc.

The adapting can enable the affected MSC to rebuild from data redundantly stored on the affected MSC into the substituted mapped storage elements corresponding to the substituted real storage elements. As an example, where PSC 110 comprises eight nodes, each having seven available disks and one reserved disk, then the loss of one node can result in a loss of access to the corresponding seven available disks and one reserved disk. Where these disks are inaccessible due to the real node failure, the corresponding mapped disks of MSC 120, MSC 130, etc., can also become inaccessible. Continuing the example, mapped cluster control component 102, 104, etc., can enable substituting the seven remaining reserve real disks of the seven remaining accessible real nodes of PSC 110 for the seven inaccessible available disks of the example failed real node, e.g., disk-level recovery in a singly or doubly mapped RAIN. This can result in corresponding substitute mapped disks in mapped node(s) of MSC 120, 130, etc. The MSCs, e.g., 120 130, etc., can rebuild to the substituted mapped disks, which can result in corresponding data being written to the substitute real disks. This can mitigate loss of a real node of a real cluster, e.g., PSC 110, etc., relative to a mapped cluster that can be affected by the loss of the real node. As another example, where PSC 110 comprises eight nodes, each having seven available disks and one reserved disk, then the loss of one node can result in a loss of access to the extents of the corresponding seven available disks and one reserved disk. Where these disk extents are inaccessible due to the real node failure, the corresponding mapped disks of MSC 120, MSC 130, etc., can also become inaccessible. Continuing this second example, mapped cluster control component 102, 104, etc., can enable substituting reserved extents distributed among the real disks comprising the seven remaining accessible real nodes of PSC 110 for the inaccessible extents of the example failed real node, e.g., extents-level recovery in a doubly mapped RAIN. We note that singly mapped RAINs do not rely on extents and therefore do not employ extents-level recovery. The extents-level recovery of doubly mapped RAIN can result in corresponding substitute mapped extents in mapped disks of mapped node(s) of MSC 120, 130, etc. The MSCs, e.g., 120 130, etc., can rebuild to the substituted mapped extents, which can result in corresponding data being written to the substitute real extents, which can mitigate loss of a real node of a real cluster, e.g., PSC 110, etc., relative to a mapped cluster that can be affected by the loss of the real node. Unlike singly mapped RAIN recovery at the disk level, e.g., substituting disk for disk, doubly mapped RAIN recovery at the extents level can result in associating data with more, the same, or fewer disks, nodes, etc., but a same number of extents, after a recovery than before the data became less accessible, e.g., data stored on four extents of one disk of one failed node can be recovered to four extents on four disks of two non-failed nodes, etc.

It is noted that an MSC can rebuild stored data based on data redundancy controlled by the MSCs themselves and the rebuilding is generally not based on data redundancy controlled by the real cluster. As an example, an MSC can store data in a mapped cluster redundantly, e.g., across mapped extents of mapped disks of mapped nodes of a mapped cluster, etc., such that failure of mapped extents/disks/nodes can be recovered through rebuilding from remaining data on the mapped cluster into other mapped extents/disks/nodes, which can be independent of any data redundancy feature of a real cluster supporting the MSC.

It is further noted that 'loss' of a node is intended to indicate that data of the node is less accessible due to nearly any type of software, hardware, network, etc., failure, nearly any type of data access restriction/failure, or other events that result in data being less accessible. As an example, a power outage can cause a real node of a real cluster to go into a power saving mode that can restrict access to data stored thereon, which can be regarded as a loss of the real node, despite the hardware, software, and network executing as designed, because the data has become less accessible. As another example, heavy network traffic can cause delays in accessing data of a real node of a real cluster, which can be regarded as a loss of the real node due to the data being less accessible, e.g., delays in data access are considered as reducing accessibility of the data. As a further example, a processor of a real node of a real cluster can fail, which can prevent access to data of the real node and can be regarded as a loss of the real node due to the data being inaccessible, e.g., until the processor is repaired, replaced, etc.

Figure 2:
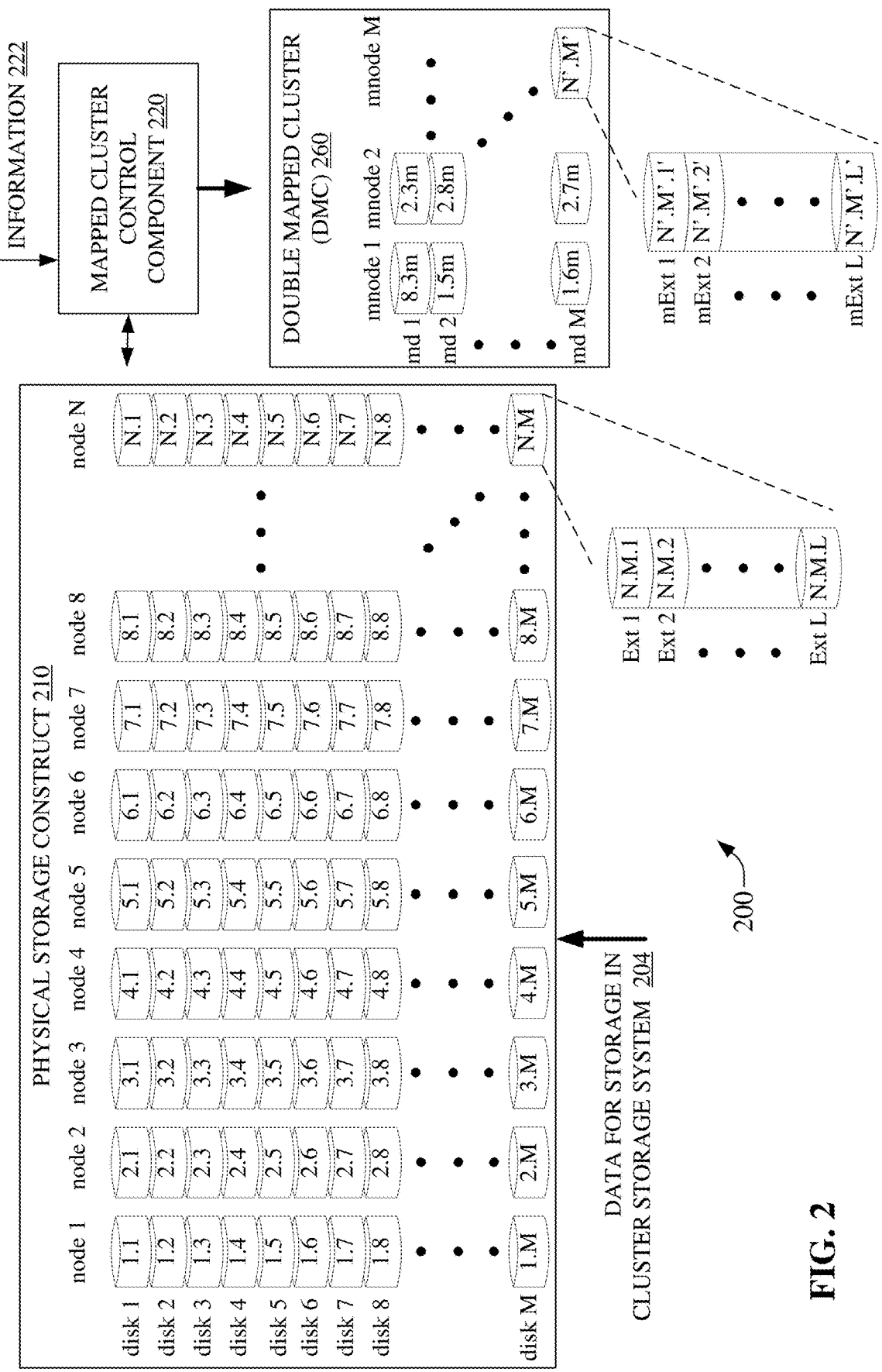
FIG. 2 is an illustration of an example system that can facilitate mitigation of a real node failure relative to a singly or doubly mapped cluster by reserving extents of real storage components across multiple real storage devices of real storage nodes comprising the real storage cluster, in accordance with aspects of the subject disclosure.

FIG. 2 is an illustration of a system 200, which can enable mitigation of a real node failure relative to a singly or doubly mapped cluster by reserving extents of real storage components across multiple real storage devices of real storage nodes comprising the real storage cluster. System 200 can comprise PSC 210 that can be the same as, or similar to, PSC 102. PSC 210 is illustrated at the disk and node level for ease of illustration, e.g., disk 1.1 indicates disk 1 of node 1. As used herein, a disk, node, and extent is typically depicted as N.M.L, N'.M'.L', etc., such that, for example, data stored at 1.1.1 is stored at an addressable storage location of node 1, disk 1, extent 1, data stored at 4.3.8 is stored at an addressable storage location of node 4, disk 3, extent 8, etc. As is illustrated in system 200, PSC 210 can comprise N nodes of M disks, e.g., disk 1.1 to N.M, etc. Moreover, each of the M disks of the N nodes can comprise L extents, see the fly out of disk N.M of PSC 210 that comprises L extents, e.g., N.M.1 through N.M.L.

Mapped cluster control component 220 can be communicatively coupled to, or be included in, PSC 210. Mapped cluster control component 220 can allocate doubly mapped cluster (DMC) 260, which can logically embody storage comprised in PSC 210. In an embodiment, DMC 260 can be allocated based on supplemental information 222. As an example, supplemental information 222 can indicate a first amount of storage is needed and mapped cluster control component 220 can determine a number of, and identity of, extents of disks of nodes of physical storage construct 210 to meet the first amount of storage. Mapped cluster control component 220, in this example, can accordingly allocate the identified extents, disks, and nodes of PSC 210 as corresponding to doubly mapped nodes (mnode, mn, etc.), disks (mdisk, md, etc.), and extents (mextent, mExt, etc.) of DMC 260, e.g., extents of disk 8.3m can correlate to an allocation of extents of disk 8.3, . . . , extents of disk N'.M' can correlate to an allocation of extents of disk N.M, etc. As such, similar to a real cluster, e.g., PSC 210, etc., DMC 260 can comprise mapped extents, for example, see fly out of doubly mapped disk N'.M' comprising mapped extents mExt 1 through mExt L, e.g., N'.M'.1' through N'.M'.L'.

Mapped cluster control component 220 can facilitate storage of data 204, corresponding to data representations of DMC 260, in the allocated storage areas of PSC 210. As such, data 204 can be stored in a more granular storage space than would conventionally be available, e.g., conventionally all disks of a node can be committed to storage, e.g., a client device is conventionally 'given' a whole real node to use, even where the 1 to M disks available in the whole real node can far exceed an amount of storage space needed by the client device. As such, by mapping portions of extents of some disks from some nodes into DMC 260, a lesser amount of storage space can be made available to the client device, for example, rather than allocating a whole real node under conventional technology, with doubly mapped RAIN technology a single extent of a single disk of a single node can be allocated, which can be significantly less storage space than the whole node. As an example, where a conventional storage cluster can allocate a minimum block of 1.2 petabytes (PB), for example in a conventional ECS storage system 1.2 PB can be the minimum storage size, this can far exceed demands of a client device in many situations. Continuing the example, a singly mapped RAIN can allocate at a whole disk level and can reduce the minimum storage size considerably. Still further in the example, doubly mapped RAIN can allocate storage at the extent level to provide still further granularity of storage space and reduce the minimum allocated space even beyond singly mapped RAIN technology. As an example, where storage can be related to storing a simple log file, storing the log file in 1.2 PB of space can be extremely inefficient use of space. Similarly, in this example, even storing the log file in several TB of disk space can be highly inefficient use of storage space. As such, allocation of storage space at the disk extent level can provide levels of granularity that are much more storage space efficient.

System 200 can comprise available disks, reserved disks, etc. An available disk can comprise a used disk, free disk, etc. As an example, PSC 210 can comprise N reserved disks for every N×M total disks, and of the (N×M)−N available disks, a percentage of those disks can be used disks and another percentage can be free disks that can become used disks. Additionally, a used disk can become a free disk, e.g., the used disk data is 'deleted' and the disk is 'freed,' etc. Moreover, a used of free disk can be swapped for a reserved disk, e.g., as part of a recovery, in reallocation of data, in modifying the topology of PSC 210, etc. Generally, a reserved disk is not available for use because it is held back to enable recovery. Also generally, non-reserved disks can either be disks in use or unused but available disks. Similarly, extents of disks can be reserved extents, available extents, used extents, free extents, etc. In an embodiment, the reserved extents can correlate to a count of extents that can be lost in PSC 210, as an example, where a selected loss tolerance value 'LTV' indicates that reserve extents be held to protect against the loss of one of eight nodes and, for example, there are 8 disks of 8 extents each in a node, e.g., LTV=1→1 node→8 disks→64 reserve extents, then one reserve extent can be designated in each disk of each of the eight nodes, e.g., there are 8 nodes of 8 disks for 64 disks that can each comprise one reserve extent, then the 64 reserve extents are provided without addition of fully reserved disks, without fully reserved nodes of disks, etc. In this example, if any one node fails, e.g., loss of 8 disks at 7 extents each because one extent of each of the disks was a reserved extent, then there remain 56 reserve extents on the remaining 7 nodes of 8 disks of 8 extents because one extent of each of the 7×8 disks is a reserve extent that can be substituted for the 56 less accessible extents of the failed node, e.g., the failed node comprises 8 disks with 7 used/free (but not reserved) disks that can be exchanged for the 56 reserved extents distributed across the remaining seven nodes. Where LTV=2, 3, . . . , etc., additional extents can be reserved corresponding to a count of disks that can be lost when LTV nodes are lost. As an example, for a 128 node real cluster having 64 disks of 8 extents per node, and for LTV=2, then 1024 extents can be reserved across the 65,536 extents of the example real cluster.

In an embodiment of system 200, reservation of some extents of some disks of some nodes of PSC 210 can enable mitigation of a real node failure relative to a doubly mapped cluster, e.g., swapping functioning extents from other functioning disks for non-functioning extents of non-functioning disks as a true extent-level swap, etc. In some embodiments, reservation of some extents of some disks of some nodes of PSC 210 can similarly enable mitigation of a real node failure relative to a singly mapped cluster, e.g., swapping all extents of a functioning disk for all extents of a non-functioning disk as a pseudo disk-level swap, etc. In other embodiments, reservation of some disks of some nodes of PSC 210, without regard to the extents, can enable mitigation of a real node failure relative to a singly mapped cluster, e.g., swapping a functioning disk for a non-functioning disk as a true disk-level swap, etc.

Generally, the reserve extents can be distributed among the disks/nodes of the real cluster. In an aspect, where knowledge of which node will become less accessible is unavailable, it can be desirable to distribute the reserve extents in a manner that reduces a likelihood of insufficient reserve extents being available for mitigation of a loss of the real disks comprised in a real node. As an example, distributing 64 reserve extents across eight disks of eight nodes of a an 8.8.8 real cluster results in losing only one reserve extent in each of eight disks for the loss of any one node of the 8.8.8 real cluster and, further, also results in having seven reserve extents for each of eight disks in each of the seven remaining nodes as substitutes for the less accessible or failed node. Poor distribution can result in having too few reserve extents, for example, reserving 16 extents in each of two disks of two nodes of the example 8.8.8 real cluster, which is still reserving 64 extents but in a less distributed manner, can result in loss of 32 of the extents where one of the two nodes fails, which can still leave 32 available reserve extents as substitutes for the 6×8=48 less accessible extents of the failed node where it is noted that the failed node comprises eight disks where two were reserve disks and six were available disks having 8 extents each. While it can be easy to visualize simply reserving an entire node as a substitute for a failed node, this extra node can indeed comprise the reserve extents, but can also be associated with use of additional computing resources dedicated to operation of the extra node that is merely held in reserve, e.g., an 8.8.8 real cluster can be expanded to an 9.8.8 real cluster, e.g., 8×8×8 active portion+1×8×8 reserve portion, such that the loss of any of the active nodes of the 9.8.8 cluster can be mitigated by substitution of the reserve node. Whereas this third example can consume additional computing resources, e.g., an additional node controller/processor(s), memory, networking, etc., to support disks held in reserve, it can be a less favored distribution technique in contrast to a distribution, preferably an even distribution, of the reserve extents among the disks of the other already available nodes, e.g., it can take little additional computing resources to reserve extents distributed among the disks of available nodes, in contrast to the computing resources needed to hold an entire reserve node in a real cluster.

Figure 3:
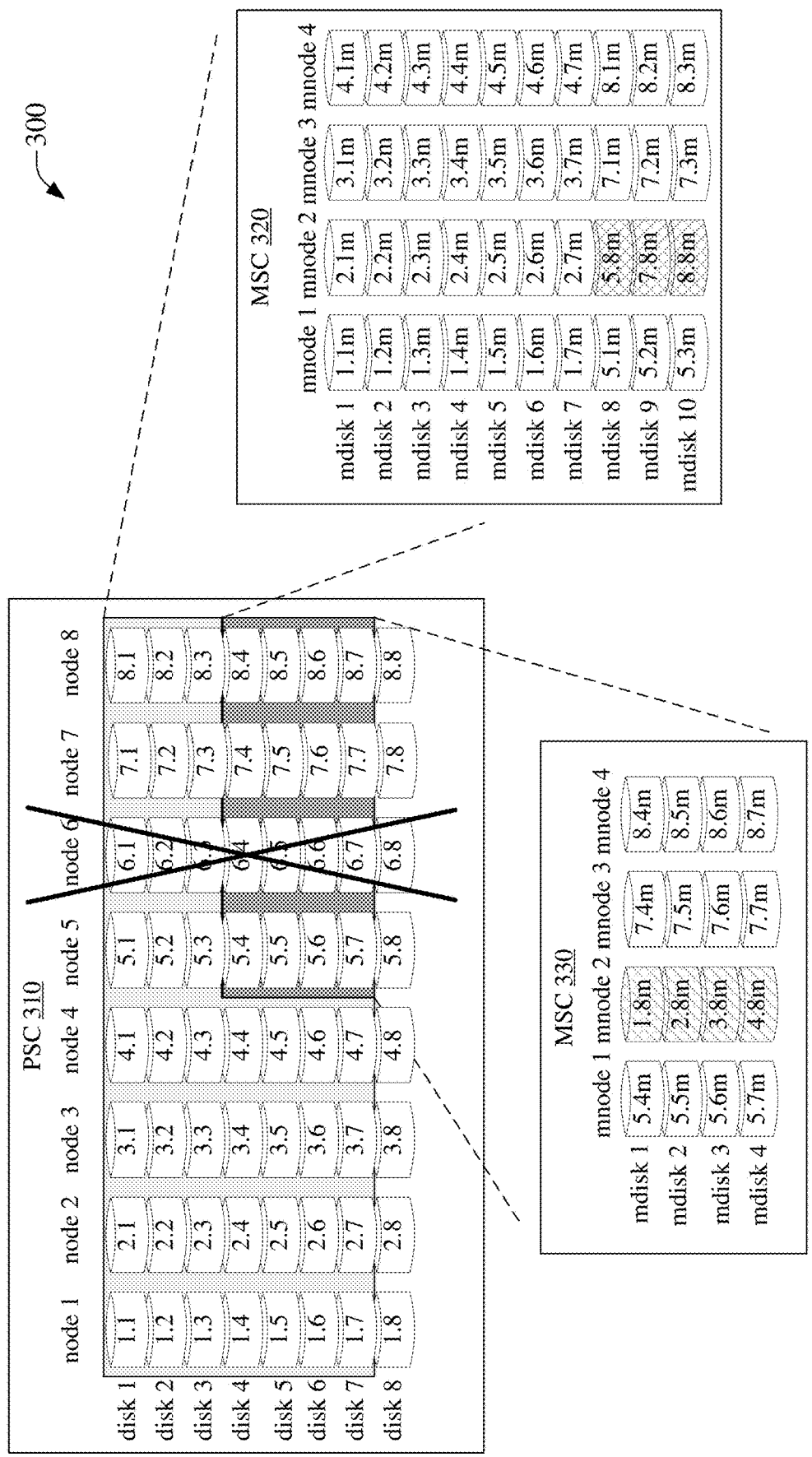
FIG. 3 is an illustration of an example system that can enable rebuilding mapped nodes of a singly or doubly mapped cluster to mitigate a real node failure, in accordance with aspects of the subject disclosure.

FIG. 3 is an illustration of a system 300, which can facilitate rebuilding mapped nodes of a singly or doubly mapped cluster to mitigate a real node failure, in accordance with aspects of the subject disclosure. System 300 can comprise PSC 310. PSC 310 can comprise a real cluster, portion of a real cluster, portions of more than one real cluster, multiple clusters, etc. PSC 310 can facilitate data operations, e.g., storing data, accessing data, deleting data, moving data, copying data, duplicating data, etc. In some embodiments, PSC 310 can be part of a geographically diverse storage system. In some embodiments, PSC 310 can support data convolving storage systems, for example storing an XOR chunk that is a representation of a data from a first chunk and a second chunk in a convolved form, storing erasure coding fragments that can facilitate data recovery, etc.

In an aspect, data can be stored at a portion of PSC 310, e.g., via a data storage element of PSC. As an example, an addressable memory cell can comprise data. This example addressable memory cell can be comprised in an extent of a storage device, e.g., a hard drive, disk, solid state storage device, optical storage medium, etc., for example in an extent of one or more of disks 1.1 through 8.8, etc. It will be noted that a cluster can comprise more or fewer nodes, more or fewer disks, etc., without departing from the scope of the disclosed subject matter, as an example, PSC can be an N.M cluster comprising N nodes having M disks in each of the N nodes, etc. In an embodiment, a disk can comprise L extents, e.g., PSC 310 can be an 8.8.L cluster having 64×L extents. In an aspect, a portion of PSC 310 can comprise the data storage element, a component comprising the data storage element, a portion of a component comprising the data storage element, portions or all of multiple components wherein they comprise the data storage element, etc. As an example, a portion of PSC 310 can comprise a disk, e.g., one or more of disks 1.1 through 8.8, etc., that comprises the data storage element that stores data. The data can be interacted with, operated on, etc., via a communicative coupling with PSC 310, with a component comprised in a portion of PSC 310, etc. As an example, PSC 310 can be a real cluster comprising real nodes, e.g., node 1 through node 8, etc., that each comprise real disks, e.g., disk 1 through disk 8, correspondingly, etc., wherein each real disk can comprise L extents, etc., wherein a portion of PSC 310 is comprised in a subset of the set extents from disks 5.4 through 8.7 indicated by the dark grey shading, etc., wherein the extents of disks 5.4 through 8.7, etc., comprise data storage elements, and wherein a data storage element of the data storage elements can store data, whereby the data can be written into the storage element via a communicative coupling between PSC 310 and another device, such that the data is associated with an address (or other identifier) of the data storage element enabling operations/interactions with the data. As is noted herein, PSC 310 can be a large data storage space, e.g., a real cluster of many nodes, e.g., N nodes, each having many large disks, e.g., M disks in each of the N nodes, etc., each having L extents, which can enable efficient use of the storage space for many types of storage via support of smaller data storage space allocations, e.g., less than entire nodes, less than entire disks, etc. Accordingly, mapped RAIN technology, e.g., single or doubly mapped RAIN, as disclosed, can provide more granular use of PSC 310.

System 300 can comprise an MSC, e.g., MSC 320, MSC 330, etc., that can logically represent a portion of PSC 310 as a mapped cluster. A mapped cluster can therefore comprise a DR of data stored in a portion of PSC 310, wherein the DR can correspond to data of the portion of PSC 310, etc. The MSC can enable interactions with the DR that can be propagated to the data. In some embodiments, MSCs can comprise mapped nodes. As an example, MSC 320 can comprise an mnode 1 through an mnode 4, etc., having mapped disks, e.g., 1.1*m*, 1.2*m*, . . . , 8.2*m*, 8.3*m*, etc., which can logically represent a portion of PSC 310, such as the light grey shaded portion of PSC 310, etc., wherein, for example, mapped disk 3.3*m* of MSC 320 can correspond to the extents of disk 3.3 of PSC 310 in the light grey shaded area of PSC 310, etc. As another example, MSC 330 can comprise an mnode 1 through an mnode 4, etc., having mapped disks, e.g., 5.4*m*, 5.5*m*, . . . , 7.7*m*, 8.7*m*, etc., which can logically represent a portion of PSC 310, such as the dark grey shaded portion of PSC 310, wherein, for example, mapped disk 7.5*m* of MSC 330 can correspond to extents of disk 7.5 of PSC 310 in the dark grey shaded area of PSC 310, etc. It is noted that node 6 of PSC 310, e.g., a real node of the real cluster, can correspond to mapped disks of MSCs, e.g., before failure of node 6, the extents of disks 6.1, 6.2, and 6.3 can correspond to mnode disks at mdisk 8, 9, and 10, though system 300 is illustrated after substitution. It is further noted that similarly, the extents of disks 6.4-6.7 of real node 6 can correlate to the mapped disks of mnode 2 comprised in MSC 330, but again, system 300 is illustrated after substitution of reserved disks.

System 300 can comprise reserved extents as pseudo reserved disks wherein all the extents of a disk are allocated together to act as a single reserved disk, e.g., disks 1.8 through 8.8 of PSC 310, etc. This can be in contrast to allocating less than all extents of a disk as reserve extents. In an embodiment, the reserved extents, in pseudo disk form, can correlate to a count of disks that, if lost from PSC 310, can be tolerated, e.g., a loss tolerance value 'LTV=1' and there are eight accessible disks each having L reserve extents, including one reserve pseudo disk per node, then the count of pseudo disks to be held in reserve can be 8×L reserve extents, e.g., eight reserve disks multiplied by L extents per reserve disk, distributed among the example eight nodes.

In system 300, failure of real node 6 can affect three mapped nodes corresponding to the light grey mapped portion, four mapped nodes corresponding to the dark grey mapped portion, and one reserve disk, e.g., 6.8 is a reserve pseudo disk that is less accessible due to the loss of real node 6. As is illustrated, the remaining seven reserve pseudo disks, e.g., 1.8 through 8.8, excluding 6.8, can be substituted for the storage space previously accorded to the extents of disks 6.1 through 6.7., e.g., the extents of each less accessible disk can be recovered to the extents of a reserve pseudo disk in a disk-wise manner that can emulate singly mapped RAIN. Accordingly, these substituted real disk extents can be similarly substituted into the mapped clusters. In an embodiment, MSC 320 can be provided substitute storage space via reserve real disk extents 5.8, 7.8, and 8.8, which can be indicated as 5.8*m*, 7.8*m*, and 8.8*m* respectively in the mapped cluster. In a similar embodiment, MSC 330 can include available mapped storage space for mnode 2 that can correspond to the reserved extents of real disks 1.8, 2.8, 3.8 and 4.8.

It is noted that the substituted real space and corresponding mapped storage space will typically not contain the lost data that was stored on the real disks of lost node 6 of PSC 310. As such, the MSC can treat the substituted mapped pseudo disks as 'new mapped disks,' e.g., the substituted mapped pseudo disks that correspond to the substituted real disks do not contain useable data. Accordingly, the MSCs can then rebuild the stored data to the extents of the 'new disks' based, for example, on data redundancy and repair technology of the MSC, e.g., from XOR chunks, from erasure coding fragments, etc. As an example, MSC 330 can comprise redundant data allowing for the loss of any one mapped node and, accordingly, when a mapped node, e.g., mnode 2, is lost as a result of the loss of real node 6 of PSC 310, MSC 330 can rebuild the mapped cluster via writing data into the substituted pseudo disks in mnode 2, e.g., 1.8*m*, 2.8*m*, 3.8*m*, and 4.8*m*, based on the data already existing in a redundant format on the mapped disks of mnode 1, 3, and 4. This can occur without PSC 310 directly managing restoration of data lost when real node 6 is lost. In an aspect, PSC 310 can simply make reserve pseudo disks available to the mapped clusters to allow the mapped clusters to restore themselves via the substituted pseudo disks. This can alleviate PSC 310 being designed to manage redundant data.

In an aspect, it is to be noted that the redundant nature of the MSCs can be supported with fewer reserve pseudo disks than might otherwise be needed. It can be observed that both MSC 320 and MSC 330 can recover due to their redundant data via the eight reserved real pseudo disks, as described herein. It will be appreciated that were each of the MSCs to manage their own reserved pseudo disks, then MSC 320 would typically reserve 10 pseudo disks and MSC 330 would typically reserve four pseudo disks, for a total of 14 reserved pseudo disks. This is greater than the eight reserved real pseudo disks and the corresponding representations as reserved mapped substitute disks. This can enable providing reserve pseudo disk capacity via the real cluster, e.g., via disk-wise substitution of the extents of a real disk, via mapping as a substitute mapped disk, to replace a mapped disk that corresponded to a lost disk, which can be more efficient than providing reserve disk capacity via individual mapped clusters.

Figure 4:
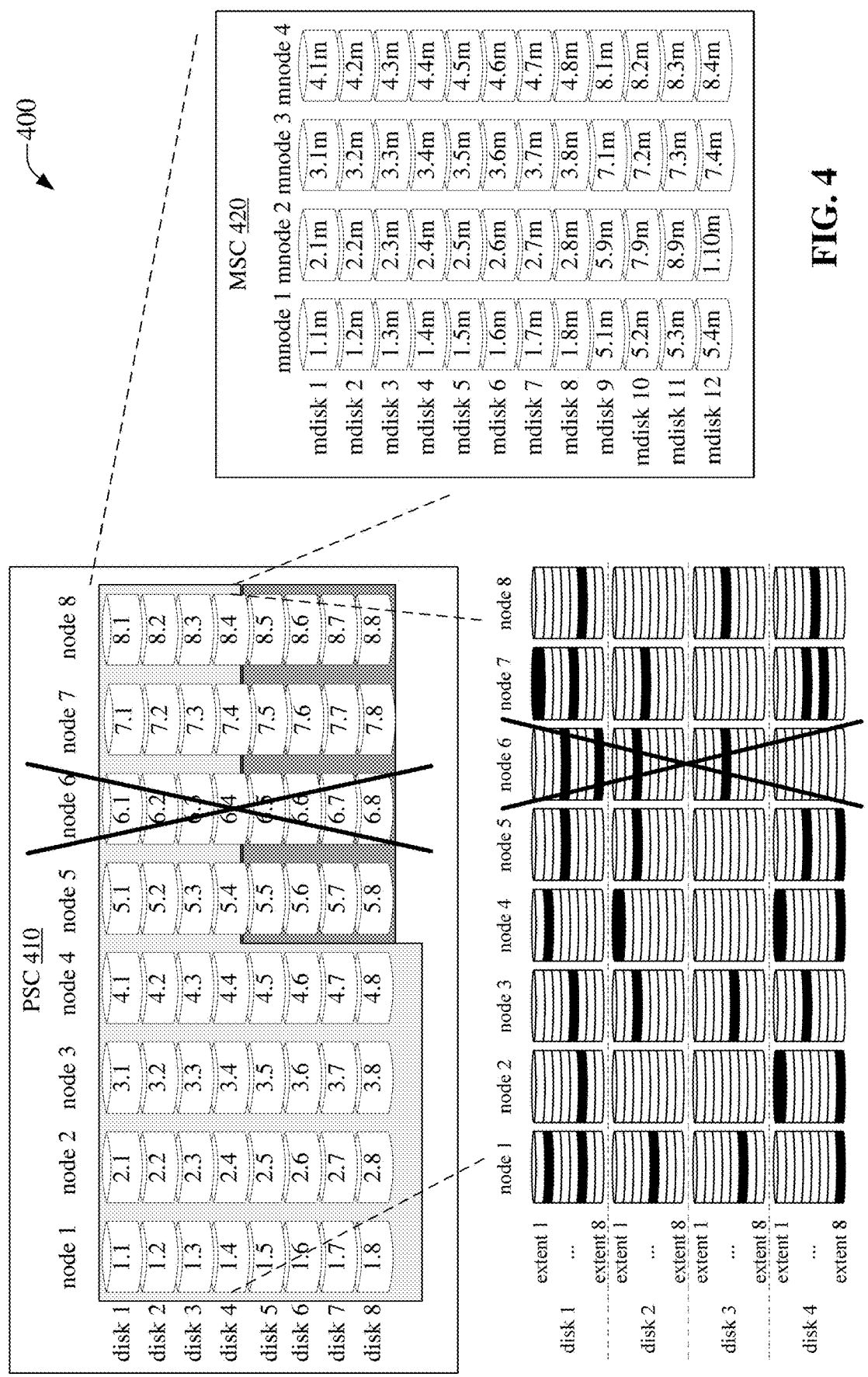
FIG. 4 illustrates an example system that can facilitate rebuilding mapped nodes of a doubly mapped cluster to mitigate a real node failure, in accordance with aspects of the subject disclosure.

FIG. 4 is an illustration of a system 400, which can facilitate rebuilding mapped nodes of a doubly mapped cluster to mitigate a real node failure, in accordance with aspects of the subject disclosure. System 400 can comprise PSC 410. PSC 410 can comprise a real cluster, portion of a real cluster, portions of more than one real cluster, multiple clusters, etc. PSC 410 can facilitate data operations, e.g., storing data, accessing data, deleting data, moving data, copying data, duplicating data, etc. In some embodiments, PSC 410 can be part of a geographically diverse storage system. In some embodiments, PSC 410 can support data convolving storage systems, for example storing an XOR chunk that is a representation of a data from a first chunk and a second chunk in a convolved form, storing erasure coding fragments that can facilitate data recovery, etc.

In an aspect, data can be stored at a portion of PSC 410, e.g., via a data storage element of PSC, e.g., an addressable memory cell, etc. This example addressable memory cell can be comprised in an extent of a storage device, e.g., a hard drive, disk, solid state storage device, optical storage medium, etc., for example in an extent of one or more of disks 1.1 through 8.8, etc., we note that an example of only the extents of disk 1 through disk 4 for node 1 through node 8 is illustrated due to space constrains in the figure and that disk 5 thorough disk 8 of node 1 through node 8 will each similarly comprise 8 extents each. It is further illustrated that some extents are blackened out to indicate example reserved extents in some of the extents comprised in PSC 410. It is noted that not all disks comprise a reserved extent and that some disks can comprise more than one reserved extent, although generally it is desirable to distribute the reserved extents as evenly as is practicable to avoid situations where the loss of a real node can result in less than enough remaining reserved extents to enable a full recovery without additional interaction with the real cluster to provide more unused extents. It will be noted that a cluster can comprise more or fewer nodes, more or fewer disks, more or fewer extents, etc., without departing from the scope of the disclosed subject matter, as an example, PSC can be an N.M.L cluster comprising N nodes, having M disks in each of the N nodes, having L extents in each of the M disks in each of the N nodes, etc., wherein system 400 illustrates PSC 410 as an 8.8.8 cluster. Where PSC 410 is an 8.8.8 cluster, PSC 410 can comprise 512 extents that can facilitate more granular storage than the 64 disks in an 8×8 cluster, or the 8 nodes in a 1×8 cluster.

In an aspect, a portion of PSC 410 can be allocated to MSC 420, e.g., MSC 420 can be a 4×12×8 doubly mapped cluster mapped to the light grey shaded area of PSC 410. However, unlike a singly mapped cluster, a mapped disk of MSC 420 can be comprised of extents from one or more disks/nodes of PSC 410. As an example, mapped disk 1.1.*m* can map to one extent of each of real disks 1.1. through 1.8. As another example, mapped disk 1.1*m* can map to four contiguous extents of real disk 3.1, and extents 1-2 and 6-8 of real disk 5.2. Similarly, the dark grey portion can map to a second doubly mapped RAIN cluster, to a singly mapped RAIN cluster, etc., not illustrated for clarity and brevity.

In example system 400, loss of real node 6 of PSC 410 can affect MSC 420, e.g., where the extents of real disks 6.1, 6.2, 6.3, and 6.4, map to some mapped disks of MSC 420, the data stored thereon can become less accessible. It is noted that no particular mapping is needed to comprehend the aspect illustrated in system 400 and so, for clarity and brevity, no example mapping is provided, e.g., some mapped disks of MSC 420 comprise one or more of the extents of real disks 6.1-6.4 that have become less accessible. As is illustrated in the extents fly out of the first four disks of the nodes of PSC 410, the loss of node 6 can correspond to the loss of reserved and available extents. The lost available extents can be recovered by MSC 420 and written to substitute extents drawn from the reserved extents of the other nodes, e.g., the black extents of the other illustrated nodes. The substitution of the other reserved extents can be via altering a corresponding mapping of MSC 420, such that the disks of MSC 420 now comprise different extents than before the loss of real node 6. Wherein MSC 420 determines that the mapped disks present less accessible data, MSC 420 can recover from redundant data stored via MSC 420, which can result in recovering less accessible data at the mapped cluster level to the mapped disks now comprising substituted extents.

It is noted that the substituted real space and corresponding mapped storage space will typically not contain the lost data that was stored on the real extents of lost node 6 of PSC 410. As such, MSC 420 can treat the substituted reserved extents as 'new extents,' or the mapped disks comprising the substituted reserved extents as 'new disks,' etc., e.g., the substituted reserved extents or mapped disks comprising mapping to at least one substituted reserved extent can be rebuilt. As an example, if mapped disk 1.1*m* is comprised one extent from each of disk 1.1 to 8.1, e.g., 1.1*m* maps to 8 extents from 8 disks in 8 nodes, then the loss of the extent from disk 6.1 can result in substitution of a second extent from disk 1.1, as illustrated disk 1.1 comprises two reserve extents. The updated mapping of 1.1*m* is now to two extents in 1.1, one extent in each of 2.1-5.1, and one extent in each of 7.1-8.1. This can affect access to data in mapped disk 1.1*m*. It is to be noted that the loss of the extent from 6.1 can also NOT result in less access to data via 1.1*m*, e.g., there may be no data written to 1.1*m* in some circumstances, there may have been no data written to the portion of 1.1.*m* that mapped to the extent of 6.1 lost, etc. However, assuming data has become less accessible to MSC 420 in the above example, MSC 420 can recover disk 1.1*m* employing the two extents in 1.1, one extent in each of 2.1-5.1, and one extent in each of 7.1-8.1.

In an aspect, it is to be noted that the redundant nature of the MSCs can be supported with fewer reserve extents than might otherwise be needed. It can be observed that MSC 420 can recover due to their redundant data via the reserved extents illustrated and described herein. It will be appreciated that were MSC 420 to manage its own reserved storage, then MSC 420 can reserve 12 mapped disks×8 mapped extents=96 reserved extents of storage space which is more storage space than reserving 8 real disks×8 real extents=64 extents that can be protected by holding 64 reserved real extents. This is feasible because the maximum loss of mapped extents resulting from a loss of a real node does not exceed 64 extents, regardless of the mapped cluster having 12 mapped disks in a mapped node. More still, in the present example, the loss of real node 6 results in a loss of 48 extents mapped into mapped disks of MSC 420, which is easily recoverable from holding 64 reserved real extents that are well distributed. The disclosed doubly mapped RAIN node failure technology can be more efficient than providing reserve disk capacity via individual mapped clusters, or holding reserved real nodes.

Figure 5:
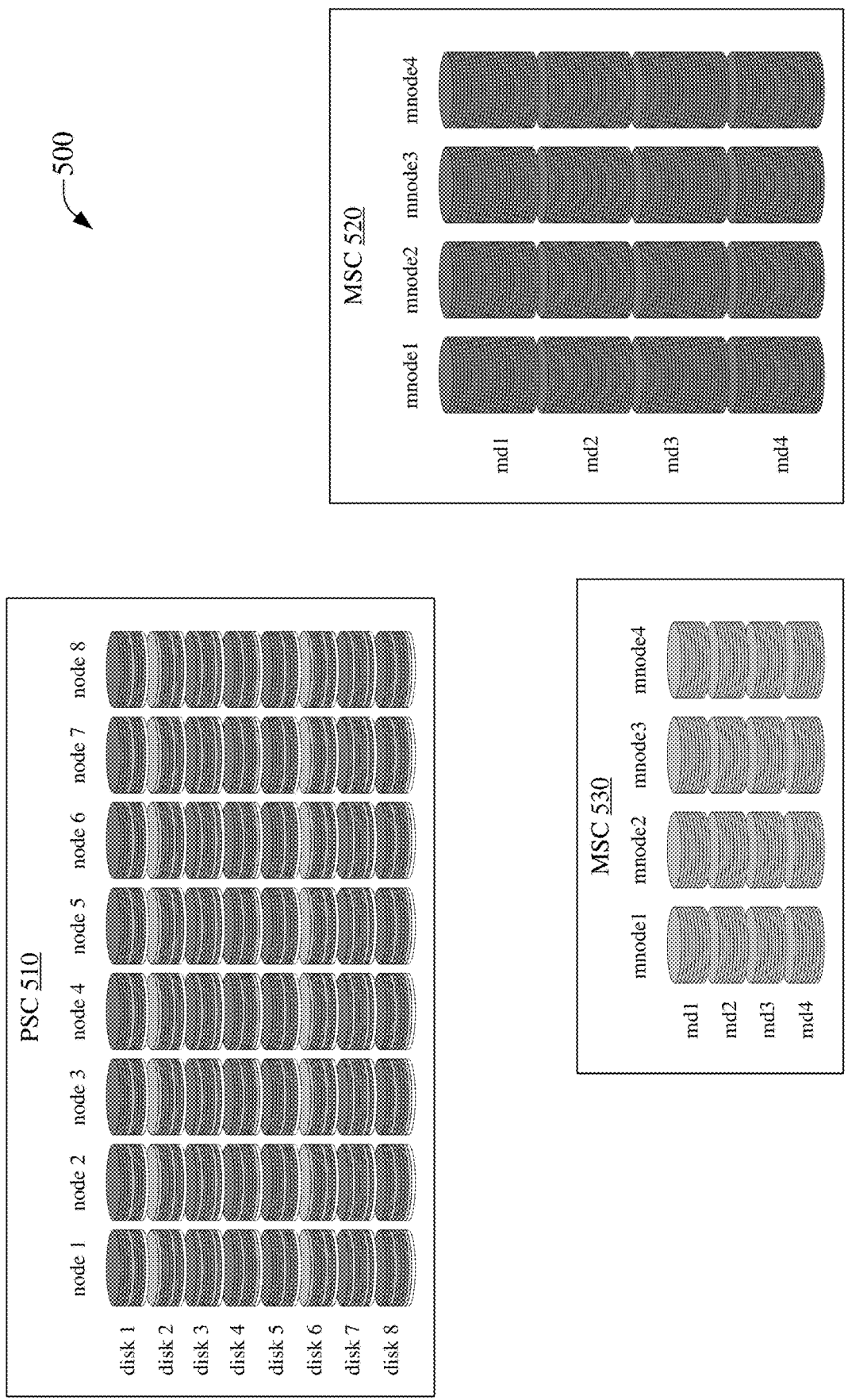
FIG. 5 illustrates an example system that can facilitate rebuilding mapped nodes of a doubly mapped cluster comprising mapped disks having a mapping to a selectable number of extents of real disks to mitigate a real node failure, in accordance with aspects of the subject disclosure.

FIG. 5 is an illustration of a system 500, which can enable rebuilding mapped nodes of a doubly mapped cluster comprising mapped disks having a mapping to a selectable number of extents of real disks to mitigate a real node failure, in accordance with aspects of the subject disclosure. System 500 can comprise PSC 510 that can comprise real nodes comprised of real disks that are each comprised of real extents. System 500 can support MSC 520 that, for example, can comprise mapped nodes comprising mapped disks. Unlike MSC 530, that can also comprise mapped nodes of mapped disks, each with an equal number of mapped extents as the real disks of PSC 510, MSC 520 can have mapped disks that comprise a mapping to more real extents, e.g., the mapped disks of MSC 520 can be larger than the real disks then map to or, in other words, the extents of more than one real disk can be mapped into a mapped disk of MSC 520. As is illustrated, mapped disk 1.1*m*, e.g., the disk of mnode1.*md*1, can comprise a mapping to 24 extents of PSC 510 and, where each real disk of PSC 510 comprises 8 real extents, a mapped disk from MSC 520 can be regarded as having three real disks of capacity.

In an embodiment, PSC 510 can comprise one reserve extent per real disk, e.g., each real disk can have seven available extents and one reserve extent. This embodiment illustrates an even distribution of reserve extents. Correspondingly, the disks of MSC 520 can each be selected to comprise 21 available extents and three reserve extents. In this manner, loss of real node can result in the loss of 8 disks×(7 available extents and one reserve extent)=loss of 56 extents and 8 reserve extents. Where, for example, MSC 520 maps mnode3 to all extents of node 6 and all extents of disks 1-4 of node 7, and where node 6 becomes less accessible, then mnode3 of MSC 520 can be impacted by losing ⅔rds of the mapped extents/reserve. Given that, in this example, there are 64–8 remaining reserved extents, e.g., the 8 reserved extents of node 6 are less available, the 56 less available extents of node 6 can be substituted with the 56 remaining reserve extents to facilitate MSC 520 recovering impacted mnode3. Where mnode3 comprises 84 mapped extents and 12 mapped reserve extents, all of the reserved real extents can be used to facilitate recovery of mnode3 where real node 6 becomes less available. Alternatively, where node 7 is lost instead of node 6, only ⅓rd of mnode3 of MSC 520 is impacted and, in PSC 510 there remain 64–8 reserved extents, some of which can be substituted for the less available extents mapping to mnode3. For real node 7 becoming less available, and where again mnode3 comprises 84 mapped extents and 12 mapped reserve extents, now 28 of the 56 reserved real extents can be used to facilitate recovery of mnode3., although the remaining 28 reserved real extents can be used to enable recovery of other MSCs.

In an aspect, mapped disks in a doubly mapped cluster can comprise mappings to more, less, or the same number of extents and reserve extents as are comprised in a real disk. As an example, a mapped disk can comprise 24 extents of capacity while a real disk comprises 8 extents, see MSC 520. As another example, a mapped disk can comprise 8 extents of capacity while a real disk comprises 8 extents, see MSC 530. In a further unillustrated example, a mapped disk can comprise four extents of capacity while a real disk can comprise 12 extents. Other permutations are readily appreciated and all are considered within the scope if the presently disclosed subject matter even where not explicitly recited for the sake of clarity and brevity. Additionally, the counts do not have to integer multiples of real disk extent counts, e.g., a mapped disk can comprise 5 extents of capacity and a real disk can comprise 13 extents, etc. Moreover, distribution of reserved extents is preferably even, the disclosed subject matter is not so restricted and uneven distributions of reserved extents are possible, e.g., some real disks of PSC 510 can have more or fewer reserved extents than other real disks of PSC 510. Additionally, some additional reserve extents can be selected, for example to allow tolerance of failures of more than one real node, to compensate for uneven distribution of reserve extents, etc.

Figure 6:
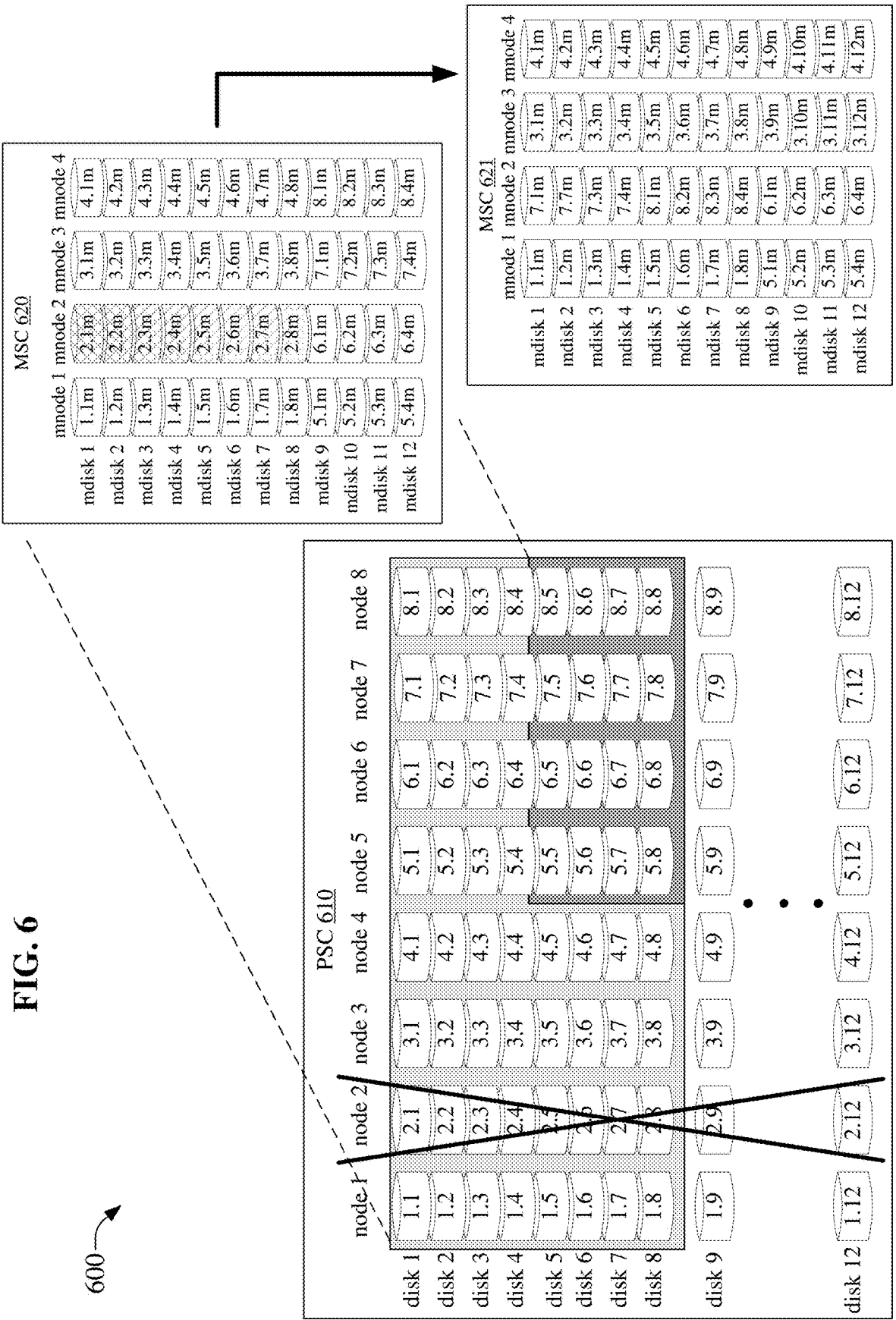
FIG. 6 illustrates an example system that can facilitate rebuilding mapped nodes of a mapped cluster via reserved extents to mitigate failure of a real node of the real cluster, in accordance with aspects of the subject disclosure.

FIG. 6 is an illustration of a system 600 that can facilitate rebuilding mapped nodes of a mapped cluster via reserved extents to mitigate failure of a real node of the real cluster, in accordance with aspects of the subject disclosure. System 600 can comprise MSC 620 that, for example, can comprise mapped disks corresponding to the light grey shaded portion of the real cluster, e.g., PSC 610. In an aspect, mitigating loss of a real node by providing substitute extents can result in loss of node diversity for the affected MSC. Node diversity can be desirable to provide protection against forms of data loss. Node diversity can be related to a best practice that no one real node of a real cluster should correspond to more than one mapped node of a given mapped cluster. Node diversity can provide data protection in that the loss of one real node should not correspond to the loss of more than one mapped node because no two mapped nodes should comprise mapped disks corresponding to real disks of a single real node. Similarly, allocating extents to mapped nodes can follow a similar form of node diversity, e.g., that extents from disks of one real node should not be mapped to mapped disks of more than one mapped node of a doubly mapped cluster. For the sake of clarity and brevity, system 600 is illustrated in pseudo disk terms, e.g., all extents of a real disk are mapped to a same mapped disk, although this same rule can be applied where only some extents of a real disk are comprised in a mapping of mapped disk.

In an aspect, PSC 610 can provide reserve storage space in the form of reserve extents in real disks distributed among the several available real nodes, e.g., PSC 610, for example, can comprise reserve extents in any of real disks 1.1 to 8.12, etc. The distribution can be even or uneven, although where it is uneven excess reserve extents can alleviate potential data loss events, e.g., it is desirable to have at least enough reserve extents to provide substitute events to the loss of any real node of PSC 610. Of note, where there excess capacity in PSC 610, some of this excess capacity can be allocated to additional reserved extents that can provide 'cushion' where the distribution of reserve extents may be less than even. As an example, where MSC 620 uses the light grey portion of PSC 610, and another unillustrated MSC uses the dark grey portion, unused storage space in disks 9-12 of nodes 1-8 can be allocated as extra reserve extents.

System 600 is illustrated after failure of real node 2, where real node two corresponded to the cross hatched portions of mnode 2 of MSC 620 before the failure of real node 2. In response to the failure of real node 2, other reserve extents of real disks from real nodes 1 and 3-8 can be substituted for the lost extents of the real disks of real node 2. Accordingly, MSC 620 can be provided with corresponding substitute mapped disks or healed mapped disks by substitution or reserve extents, e.g., replacing or curing the lost mapped disks 2.1m through 2.8m at the extent level, albeit shown in a pseudo disk format. As noted, this can result in loss of node diversity.

In an embodiment, mode diversity can be preserved by adapting MSC 620, for example resulting in MSC 621, such that the substituted mapped disks are absorbed to prevent mapped disks of more than one mapped node of MSC 621 from corresponding to extents of real disks of one node of PSC 610. In this example adaptation of MSC 620 into MSC 621, mapped disks 7.1m through 7.4m and 8.1m through 8.4m, which previously were associated mnodes 3 and 4, can be moved to mnode 2 at mdisk 1 through 8 of MSC 621. Similarly, the substitute mapped disks 3.9m through 3.12m, corresponding to the extents of real disks 3.9 to 3.12, can be assigned to mnode 3 from mdisk 9-12, and the substitute mapped disks 4.9m through 4.12m, corresponding to the extents of real disks 4.9 to 4.12, can be assigned to mnode 4 from mdisk 9-12, of MSC 621. The adaptation of MSC 620, resulting in MSC 621, in response to mitigating loss of a real node via substitution of reserved storage capacity, e.g., reserved extents, distributed among real nodes of a real cluster can therefore be performed in a manner that preserves node diversity in MSC 621. It can be observed that subsequent loss of any one node of PSC 610 should not result in a corresponding loss of more than one mapped node of MSC 621.

Figure 7:
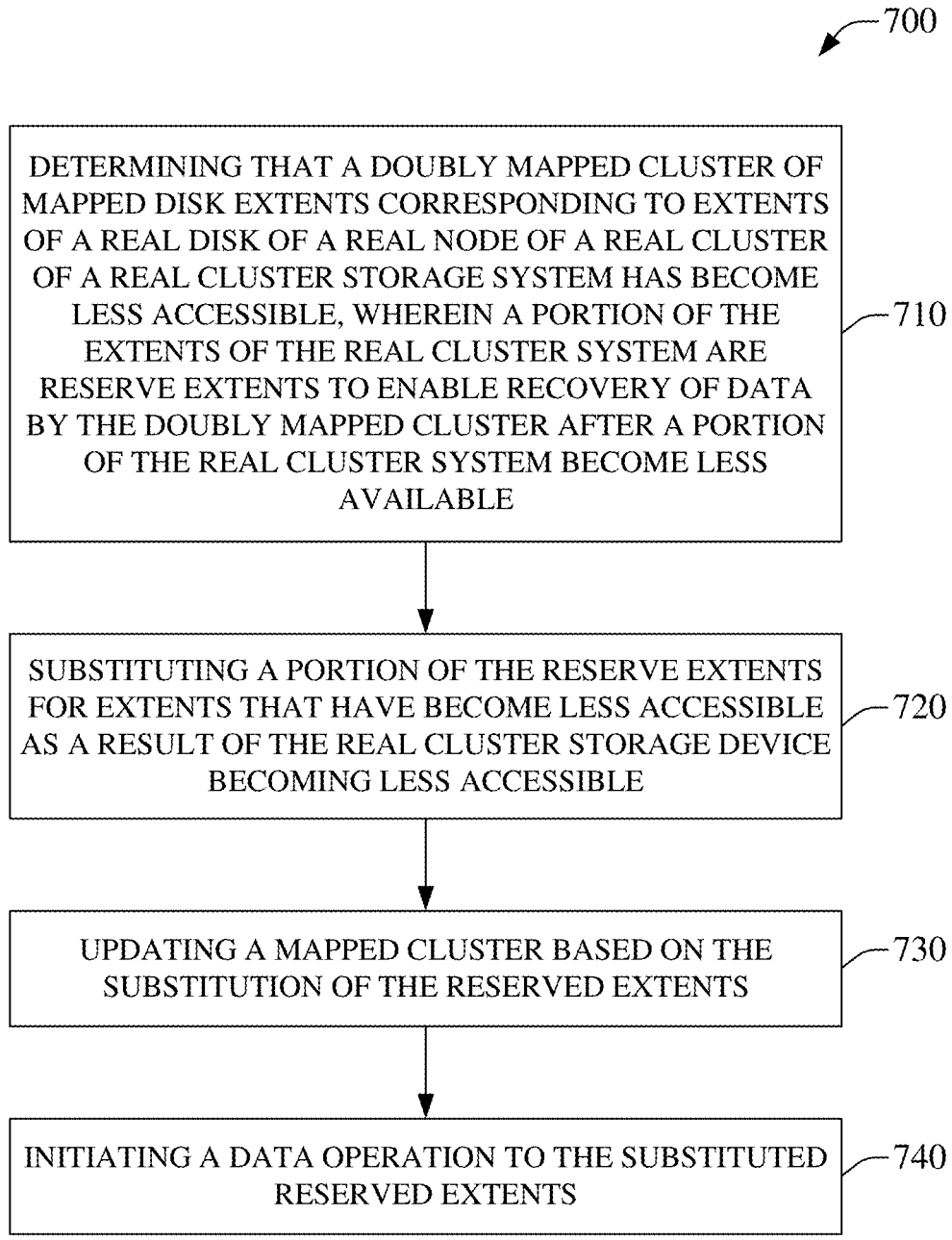
FIG. 7 is an illustration of an example method facilitating mitigating a real node failure, via reserved real extents, relative to a doubly mapped cluster, in accordance with aspects of the subject disclosure.
Figure 8:
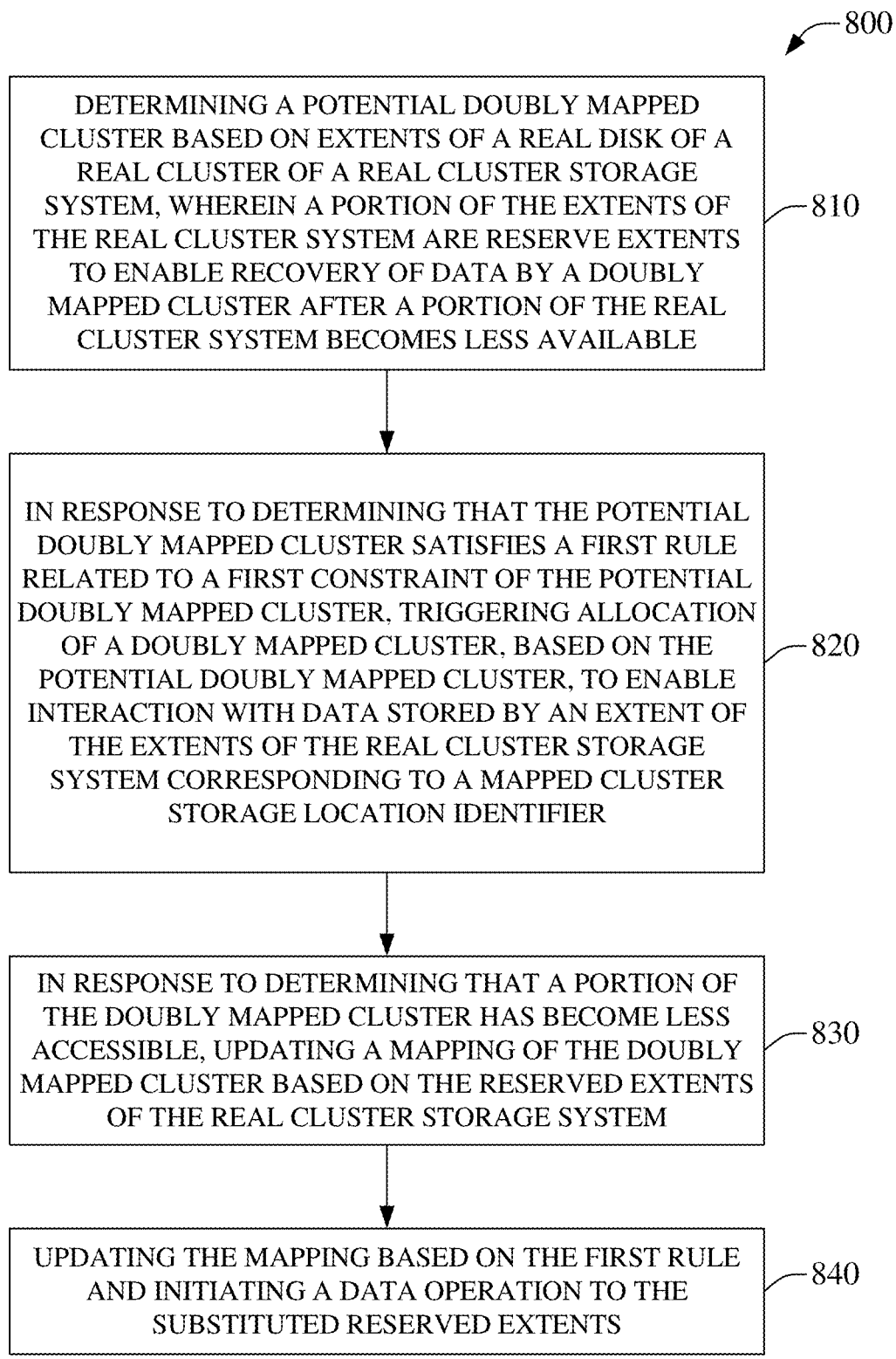
FIG. 8 illustrates an example method that enables mapped nodes of a doubly mapped cluster that preserves node diversity, wherein the doubly mapped cluster employs reserved real extents of a real cluster storage system to mitigate the real cluster becoming less accessible, in accordance with aspects of the subject disclosure.

In view of the example system(s) described above, example method(s) that can be implemented in accordance with the disclosed subject matter can be better appreciated with reference to flowcharts in FIG. 7-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 7 is an illustration of an example method 700, which can facilitate mitigating a real node failure, via reserved real extents, relative to a doubly mapped cluster, in accordance with aspects of the subject disclosure. At 710, method 700 can comprise determining that a doubly mapped cluster of mapped disk extents has become less accessible. In an aspect, the doubly mapped cluster can comprise mapped nodes that comprise mapped disks that comprise mapped extents, e.g., the mapped extents can be abstractions of real extents enabling data operations at the real extents via the mapped cluster abstraction. In an aspect, the mapped cluster can be supported by a real cluster storage system that can comprise a real cluster that can comprise a real node that can comprise a real storage device that can comprise real extents of the real storage device, e.g., the extents can be defined portions of the real storage device. In an aspect, the real extents can comprise reserved extents and available extents. In an embodiment, reserved extents can be withheld until substituted for available extents that have become less accessible. In an aspect, available extents can be used, e.g., in use for data operations, etc., or free, e.g., available but being used for data operations. In an aspect, free extents can store formatted blank values, random values, old values associated with freed storage space, etc.

In an aspect, the doubly mapped cluster can become less accessible. Less accessible can relate to portions of the doubly mapped cluster that are mapped to portions of a real cluster not facilitating access to data, data operations, etc., in a normal manner, e.g., access is slowed, stopped, etc., and can result from network connectively issues, hardware and/or software failures, planned or unplanned maintenance, burdened processors, etc. As an example, an instance of a real node can become damaged and prevent access to data in a permanent manner. As another example, an instance of a real node can undergo a restart and be unable to provide access to data in a temporary manner. As a further example, an instance of a real node can lose network connectivity and can be unable to provide access to data via that that network. Numerous other examples are readily appreciated and all are within the scope of the disclosed subject matter even where not recited for het sake of clarity and brevity.

At 720, method 700 can comprise substituting a reserved extent for an extent that has become less accessible. The substitution can be part of deploying a substitute disk/node/cluster for a less accessible disk/node/cluster, can be part of mending a disk/node/cluster that has become less accessible, etc. The substitution, in some embodiments, can result in mapping of a mapped extent/disk/node/cluster to real extents of more, fewer, or the same number of real disks/nodes/clusters as before the mapped cluster became less accessible. In an embodiment, the substitution can be transparent to users of the mapped cluster, e.g., the mapping can substitute a new extent without changing the virtualization, e.g., the mapped cluster instance interface, presented to a user.

At 730, method 700 can comprise updating a mapped cluster based on the substitution of the reserved real extent. In an aspect, failure of a real cluster storage device, which can be mitigated by substituting one or more reserved real extents, can correspond to a loss of access to a mapped storage device of the mapped cluster, wherein the mapped storage device corresponded to the now failed real cluster storage device. As such, updating the mapped cluster can result in substituting a new mapped storage device, e.g., corresponding to the substituted real cluster storage device, for the lost mapped storage device.

At 740, method 700 can comprise initiating a data operation to the substituted reserved extents. At this point method 700 can end. In an aspect, updating the mapped cluster to comprise a new extent in place of a less accessible extent can enable the mapped cluster to use the new mapped storage device, for example, to rebuild the cluster after the loss of the mapped storage device. In this regard, use of the new mapped storage device can correspond to the mapped cluster writing data to the new mapped cluster, etc., which data can be propagated to the substituted reserved real cluster storage device. In an embodiment, this can mitigate the effects of a real cluster storage device failure that can be experienced as a less accessible mapped cluster.

FIG. 8 is an illustration of an example method 800, which can enable mapped nodes of a doubly mapped cluster that preserves node diversity, wherein the doubly mapped cluster employs reserved real extents of a real cluster storage system to mitigate the real cluster becoming less accessible, in accordance with aspects of the subject disclosure. At 810, method 800 can comprise determining a potentially double mapped cluster based on extents of a real disk of a real cluster of a real cluster storage system. A portion of the extents of the real cluster storage system can be reserve extents that can enable recovery of data by a doubly mapped cluster after a portion of the real cluster system becomes less available.

The potential doubly mapped cluster can be based on extents of a real disk of a real cluster of a real cluster storage system. In an embodiment, real cluster storage system can support one or more doubly mapped clusters and can store real data on one or more real disk extents according to a relationship to doubly mapped data, e.g., real data can be stored on a first extent component through an L-th extent component of a first disk component through an M-th disk component of a first cluster node component of a first PSC through a P-th cluster node component of the first PSC, etc., of a cluster storage system component, etc., and can correspond, according to the relationship, to a representation of doubly mapped data stored according to a mapped extent of a mapped disk of a mapped node of a doubly mapped cluster, etc., which relationship can be indicated as a real address of N.M.L corresponds to a doubly mapped address of N'.M'.L'. A topology of a potential doubly mapped cluster, and potential data relationships between real data and doubly mapped data, can be managed by a mapped cluster control component. The potential doubly mapped cluster can be checked for compliance with data mapping constraints, e.g., one or more rules related to data protection, etc.

At 820, method 800 can comprise triggering allocation of a doubly mapped cluster based on the potential doubly mapped cluster in response to determining that the potential doubly mapped cluster satisfies mapping constraints, e.g., a first rule related to a first constraint of the potential doubly mapped cluster, etc. As an example a first constraint can prohibit two doubly mapped nodes from mapping to a single node of a real node. As a further example, a first constraint can prohibit two mapped nodes from comprising mapped extents corresponding to real extents of a single real disk. The constraints can be related to data protection schemes employed in a mapped cluster, e.g., a mapped cluster can be designed to be resilient against the loss of one or more mapped nodes, one or more mapped disks, one or more mapped extents, etc. Other constraints can be readily appreciated, for example, based on a type of data redundancy schema, based on available/use storage space, based on network/computing resource costs, etc., and all such constraints are within the scope of the instant disclosure even where not recited for clarity and brevity. In an aspect, a doubly mapped cluster can be allocated according to the potential doubly mapped cluster where the potential doubly mapped cluster is determined to satisfy the first rule. In an embodiment, the potential doubly mapped cluster can provide a selectable level of granularity that can be embodied in an allocated doubly mapped cluster. The level of granularity can be selected in response to an indication of an amount of data to store, a determined level of storage space efficiency, a customer/subscriber agreement criterion, an amount of storage in cluster storage system, network/computing resource costs, wherein costs can be monetary or other costs, etc.

Method 800, at 830, can comprise updating a mapping of the doubly mapped cluster according to the reserved extents of the real cluster storage system. The updating can be in response to determining that a portion of the doubly mapped cluster has become less accessible. This can result in an updated topology or mapping of the mapped cluster to real storage device extents. As an example, a first topology of the mapped cluster prior to the failure of the real cluster storage device can be updated to a second topology for the mapped cluster that substitutes reserved extents for less available extents and enables access to, or recovery of, data of the mapped cluster that was less accessible under the first topology.

At 840, method 800 can comprise updating the mapping based on the first rule. As an example, a first topology of the mapped cluster prior to the failure of the real cluster storage device can be updated to a second topology for the mapped cluster that substitutes reserved extents for less available extents, which second topology can be updated to a third topology based on the first rule. Further, at 840, a data operation to the substitute reserved extents that comply with the first rule can be initiated. At this point method 800 can end.

In an aspect, the second topology can be updated to comply with the first rule, e.g., to preserve node diversity of the mapped cluster, etc. As an example, preserving node diversity of the mapped cluster can prohibit topologies wherein failure of a real node of a real cluster correlated to the mapped cluster can cause failure of more than one mapped node of the mapped cluster. As an example, the second topology can relate to updating mapped disk relationships such that the real data stored on a real cluster storage device corresponds to mapped data associated with a mapped disk that is associated with a different mapped node than the same data according to the first topology. Whereas the mapped cluster can comprise stored information indicating relationships between a logical location of data and a physical storage address (or other identifier) of the data, mapped clusters can generally be adapted more efficiently than physically moving, coping and deleting, duplicating, mirroring, etc., real data between real storage locations. As an example, mapped data can indicate a logical location of a user data that corresponds to a physical storage address of the user data, wherein the logical location can be indicate a mapped address of a mapped storage element of a mapped storage device of a mapped node of a mapped cluster, and wherein the user data is stored in a real storage element having an storage element address of a real storage device of a real node of a real cluster. As such, operations on the mapped data can be translated into operations on the real data via the relationship between the mapped data and the corresponding real data. Moreover, the mapped data can be stored and updated, for example, so that the relationships are non-volatile, to enable bundling of operations where several operations are indicated before being optimized and performed, etc. Additionally, the mapped data can be updated to indicate a change in a relationship to real data. The changes to the relationship can, for example, be an update to the logical location of the mapped data that corresponds to the real data, e.g., the real data can remain in a same real storage element address and the mapped data can be moved, copied, duplicated, or otherwise operated on, for example, moving the logical location of the mapped data between mapped nodes, between mapped clusters, between mapped disks, etc. As such, the second topology can typically be updated with fewer data operations than would be associated with implementing a similar change in topology to a real cluster.

In an aspect, updating the mapped cluster to comprise the substitute extents and then again updating to comply with the first rule can be employed, for example, to rebuild or repair the cluster after the loss of a real cluster storage device. In an embodiment, this can mitigate the effects of losing a real cluster storage device on a mapped cluster. Moreover, the initiating the data operation after the updating to comply with the first rule can enable the mapped cluster to be node diverse while still employing the new extents that are accessible. Node diversity can provide additional data protection against subsequent potential failures of other real nodes of the real cluster by prohibiting the mapped cluster from having a topology that comprises representations of data from one real node being correlated to mapped data in more than one mapped node of the mapped cluster, which can ameliorate the loss of a subsequent real node from causing loss of more than one mapped node of the mapped cluster, which can be associated with data loss in mapped clusters designed to withstand single mapped node losses.

Figure 9:
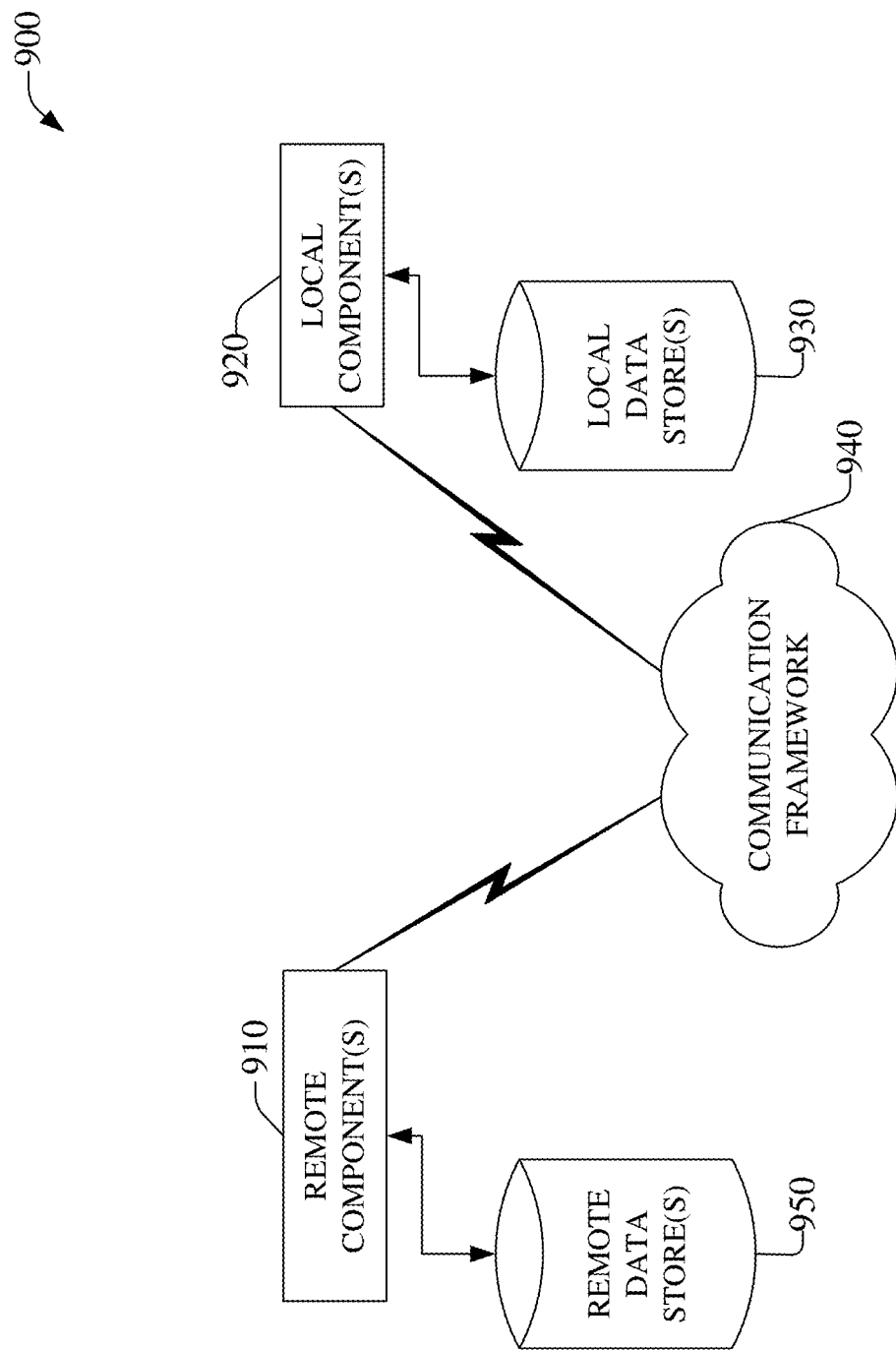
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be components of one or more physical storage component(s) 110, 210, 310, 410, 510, 610, etc., mapped cluster control component 102, 104, 220, etc., for example, connected to an MSC, such as MSC 120, 130, 260, 320, 330, 420, 520, 530, 620, 621, etc., via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise MSC 120, 130, 260, 320, 330, 420, 520, 530, 620, 621, etc., mapped cluster control component 102, 104, 220, etc., or other local components connected via communication framework 940 to remote components.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As examples, information corresponding to a topology, a change in a topology, a data operation, a relation between a data representation and a correlated data, etc., can be communicated via communication framework 940 between local and remote components, e.g., to facilitate mitigation of effects from the loss of a real storage device on a corresponding mapped cluster, operations on data and data representations, etc., as disclosed herein.

Figure 10:
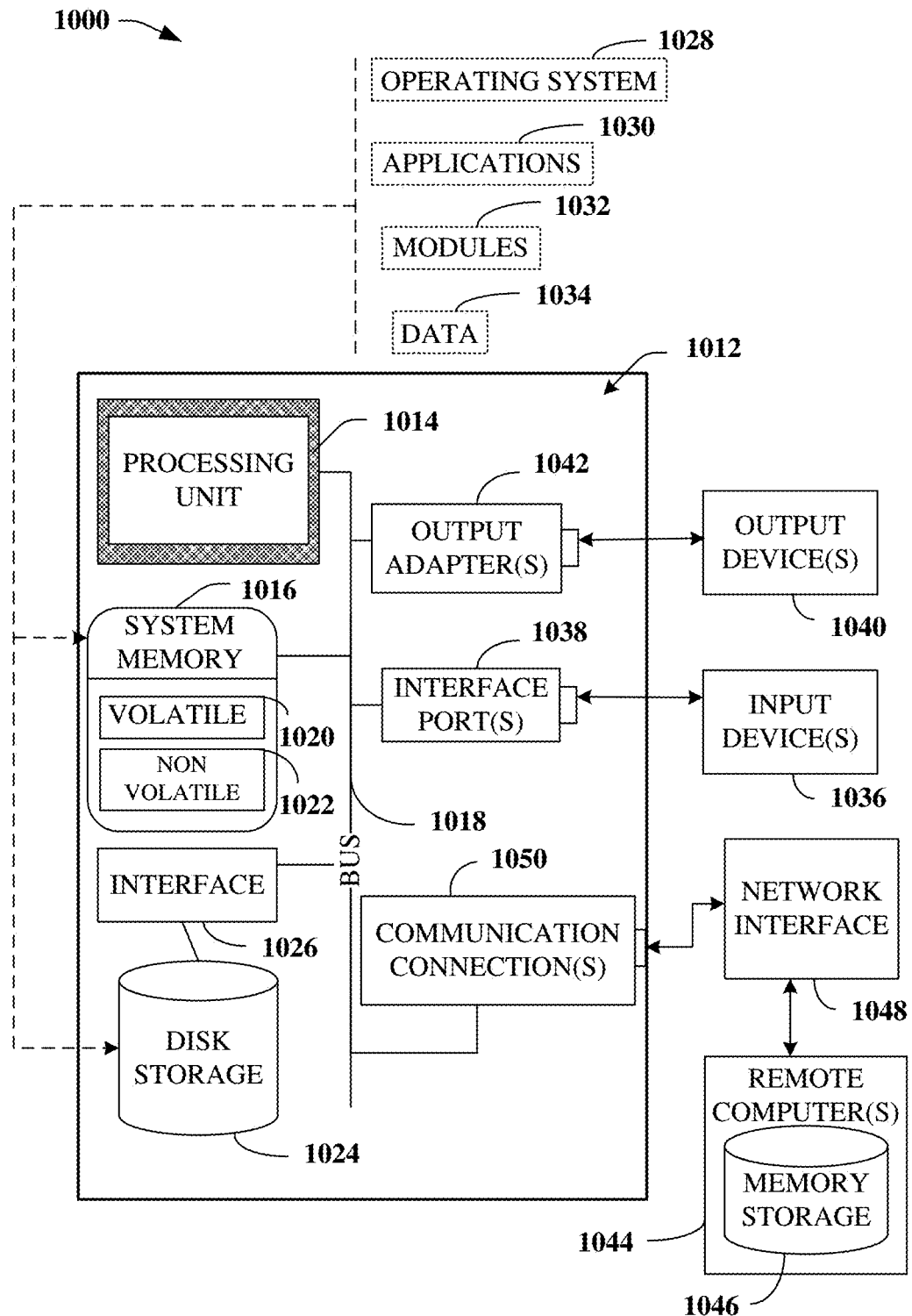
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in one or more physical storage component(s) 110, 210, 310, 410, 510, 610, etc., mapped cluster control component 102, 104, 220, etc., MSC 120, 130, 260, 320, 330, 420, 520, 530, 620, 621, etc., or other components, can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor, to perform operations, comprising receiving an indication that a real cluster has become less accessible and substituting a reserved extent for an extent of the real cluster to mitigate the real cluster becoming less accessible, determining an updated mapping based on the substituting and causing a data operation to occur based on the updated mapping, wherein the data operation facilitates improved accessibility to the real cluster.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
receiving an indication that a first extent of a first real storage device of a real cluster has become less accessible than a previous accessibility, wherein a doubly mapped cluster comprises the first extent, and wherein the real cluster comprises a second real storage device comprising a second extent;
based on the indication, substituting the second extent for the first extent that has become less accessible, wherein the substituting results in an updated mapping of the doubly mapped cluster corresponding to the real cluster being updated according to the substituting; and
performing a first data operation at the second extent based on receiving an instruction corresponding to the doubly mapped cluster and the updated mapping of the doubly mapped cluster corresponding to the real cluster.

2. The system of claim 1, wherein the first extent of the first real storage device of the real cluster has become less accessible because a real node of the real cluster has become less accessible, wherein the real node comprises the real storage device, and wherein the real node does not comprise the second real storage device.

3. The system of claim 1, wherein the first extent of the first real storage device of the real cluster has become less accessible as a result of a change in a network resource employed by the real cluster.

4. The system of claim 1, wherein the first extent of the first real storage device of the real cluster has become less accessible as a result of a change in a storage resource employed by the real cluster.

5. The system of claim 1, wherein the second extent is comprised in a group of reserved extents of the real cluster.

6. The system of claim 5, wherein extents of the group of reserved extents of the real cluster are distributed among real storage devices of the real cluster.

7. The system of claim 6, wherein the distribution of the extents among the real storage devices of the real cluster is an even distribution.

8. The system of claim 1, wherein extents of the group of reserved extents of the real cluster are sufficient in number to enable substitution of each extent of storage devices of a first node of the real cluster, and wherein the storage devices of the first node comprise the first storage device.

9. The system of claim 1, wherein the substituting the second extent for the first extent that has become less accessible is determined to satisfy a first rule related to node diversity.

10. The system of claim 1, wherein a mapped storage device of a mapped node of the doubly mapped cluster comprises a first number of extents, and wherein the first real storage device comprises a second number of extents.

11. The system of claim 10, wherein the first number of extents is greater than the second number of extents.

12. The system of claim 10, wherein the first number of extents is less than the second number of extents.

13. The system of claim 10, wherein the first number of extents is a same number of extents as the second number of extents.

14. A method, comprising:
in response to receiving an indication that a real cluster has become less accessible, updating, by a system comprising a processor, a mapping of extents of the real cluster mapped to a doubly mapped cluster resulting in an updated map, wherein the doubly mapped cluster comprises a first extent of a first disk of a first node of the real cluster, and wherein the updating the mapping is based on substituting a reserved extent of reserved extents of the real cluster for an extent of the extents of the real cluster to mitigate the real cluster becoming less accessible; and
writing, by the system, first data to the doubly mapped cluster based on the updated map, wherein the writing the first data facilitates mitigation of the real cluster becoming less accessible.

15. The method of claim 14, wherein the receiving the indication that a real cluster has become less accessible is in response to determining, by the system, an occurrence of an event selected from a group of events comprising a hardware error in the real cluster, a software error in the real cluster, a change in a network resource employed by the real cluster, and a change in a storage resource employed by the cluster.

16. The method of claim 14, wherein the substituting the reserved extent for the extent is determined, by the system, to satisfy a first rule related to node diversity.

17. The method of claim 14, wherein the substituting the reserved extent comprises selecting, by the system, the reserved extent from the reserved extents, and wherein the reserved extents are uniformly distributed among storage devices of the real cluster.

18. A non-transitory machine-readable storage medium, comprising executable instructions that, when executed by a processor, facilitate performance of operations, comprising:
receiving an indication that a real cluster has become less accessible;
substituting a reserved extent of reserved extents of the real cluster for an extent of extents of the real cluster to mitigate the real cluster becoming less accessible, wherein the extent is comprised in a doubly mapped cluster comprising a first extent of a first disk of a first node of the real cluster;
determining an updated mapping between the extents of the real cluster and mapped extents of the doubly mapped cluster based on the substituting; and
causing a data operation to occur based on the updated mapping, wherein the data operation facilitates improved accessibility to the real cluster.

19. The non-transitory machine-readable medium of claim 18, wherein a mapped disk of the doubly mapped cluster comprises a first count of the mapped extents that is different from a second count of the extents of a real disk of the real cluster.

20. The non-transitory machine-readable medium of claim 18, wherein the updated mapping preserves node diversity of the doubly mapped cluster via preventing extents of any one real node of the real cluster from corresponding to mapped extents of any group of mapped nodes of the doubly mapped cluster.

* * * * *